US009378772B2

United States Patent
Miller

(10) Patent No.: US 9,378,772 B2
(45) Date of Patent: Jun. 28, 2016

(54) SYSTEMS AND METHODS FOR VISUALIZING STORAGE AVAILABILITY OF A DVR

(71) Applicant: United Video Properties, Inc., Santa Clara, CA (US)

(72) Inventor: Ashleigh A. Miller, Denver, CO (US)

(73) Assignee: Rovi Guides, Inc., San Carlos, CA (US)

( * ) Notice: Subject to any disclaimer, the term of this patent is extended or adjusted under 35 U.S.C. 154(b) by 367 days.

(21) Appl. No.: 13/928,739

(22) Filed: Jun. 27, 2013

(65) Prior Publication Data
US 2015/0003814 A1    Jan. 1, 2015

(51) Int. Cl.
| | |
|---|---|
| *H04N 5/76* | (2006.01) |
| *G11B 27/34* | (2006.01) |
| *H04N 5/782* | (2006.01) |
| *H04N 21/433* | (2011.01) |
| *H04N 21/4335* | (2011.01) |
| *H04N 21/458* | (2011.01) |
| *H04N 21/472* | (2011.01) |
| *H04N 21/485* | (2011.01) |
| *H04N 21/488* | (2011.01) |

(52) U.S. Cl.
CPC .............. *G11B 27/34* (2013.01); *H04N 5/782* (2013.01); *H04N 21/4334* (2013.01); *H04N 21/4335* (2013.01); *H04N 21/4583* (2013.01); *H04N 21/47214* (2013.01); *H04N 21/485* (2013.01); *H04N 21/4882* (2013.01)

(58) Field of Classification Search
CPC ........... H04N 5/00; H04N 9/00; H04N 21/00; H04N 21/47214; H04N 21/4583
See application file for complete search history.

(56) References Cited

U.S. PATENT DOCUMENTS

| | | | | |
|---|---|---|---|---|
| 2007/0101053 | A1* | 5/2007 | Suzuki | ............... H04N 21/4424 711/112 |
| 2010/0107104 | A1* | 4/2010 | Bruce | ............... G06F 17/30174 715/772 |
| 2013/0243399 | A1* | 9/2013 | Casagrande | ........... H04N 5/782 386/294 |

* cited by examiner

*Primary Examiner* — Huy T Nguyen
(74) *Attorney, Agent, or Firm* — Ropes & Gray LLP

(57) ABSTRACT

Systems and methods for visualizing storage availability are provided. Storage usage activity on a recording device is analyzed and used to determine storage availability over time. Change in storage availability is visualized using a graphic. A user may select a portion of the graphic corresponding to storage availability of the recording device at a particular time in the future. Upon selection of the graphic, the user may be presented with media assets which are associated with the storage availability of the recording device at the particular future time. These media assets may be assets that are stored, scheduled to be recorded, and/or scheduled to be deleted at the particular future time.

20 Claims, 13 Drawing Sheets

SYSTEMS AND METHODS FOR VISUALIZING STORAGE AVAILABILITY OF A DVR

BACKGROUND OF THE DISCLOSURE

This disclosure relates generally to storage management of recording devices, and is particularly applicable, without limitation, to systems and methods for visualizing storage availability on a digital video recorder (DVR).

DVRs are often scheduled to record more content than they are able to store. As a result, users may be forced to delete or cancel recordings before having the opportunity to consume the media content.

To help users better manage their DVR recordings, various storage management methods have been employed. Traditional systems keep track of current storage availability based on recordings that are already stored on the DVR. Some go a step further and project storage availability in the near future based on scheduled recordings. While these systems may help prevent users from overloading the DVR, users lack the ability to efficiently pinpoint specific recordings which may contribute to storage overload at a particular point in future time. Therefore, a more effective mechanism for visualizing long term storage availability of DVRs is desirable.

SUMMARY OF THE DISCLOSURE

In view of the foregoing, systems and methods for visualizing storage availability of a recording device are described. The systems and methods described provide for visualizing the storage availability of a recording device over time based on analysis of storage usage activity on the device. The visualization may be selectable, such that a user may select a part of the visual that corresponds to a particular time. In response to the user selection, media assets associated with the storage availability of the device at that selected time may be presented to the user.

For example, the visualization may be a graph (e.g., in the form of a line graph, bar graph, etc.) plotting the storage usage or remaining storage space of a recording device (e.g., DVR) over each day of the current week. A user may select a portion of the graph (e.g., a point on the line graph, a bar in the bar graph) corresponding to a particular day in the week (e.g., the day may be in the past, present, or future), upon which the user may be presented a list of media assets that are stored, scheduled to be stored, and/or scheduled to be deleted on that selected day.

To plot the storage availability over time, storage usage activity of the recording device may be analyzed. This storage usage activity may include, but is not limited to, past recording history of media assets, current recording schedule of media assets, past deletion history of media assets, current deletion schedule of media assets, and past cancelation history of scheduled recordings of media assets. These various storage usage activities may be analyzed to extract patterns of use.

For example, the past recording history may be analyzed to deduce that a particular media asset (e.g., Game of Thrones TV episode) is always scheduled for recording at a particular day and time of each week (e.g., Sunday at 9:00 PM EST). This deduction may be used to predict that the media asset will be recorded at the same time next week. In another example, analysis of the deletion history may indicate that a media asset (e.g., Game of Thrones TV episode) is always deleted within one week of recording. Similarly, this deletion pattern may be used to predict that the media asset will be deleted at the same or substantially similar time next week (e.g., next Sunday if recorded this Sunday).

In some embodiments, the systems and methods described may provide for determining which, and if so, when media assets may likely be recorded based on various factors related to a user's interaction history with related media assets on the recording device. These factors may include, but are not limited to, viewing history of related media assets, recording history of related media assets, deletion history of related media assets, cancelation history of related media assets, user preferences of related media assets (e.g., input by the user or automatically generated by the system), the media asset type, and pattern of recording media assets. Media assets may be "related" if they share common characteristics and/or combinations of common characteristics. These characteristics may include, but are not limited to, media asset category (e.g., TV, movie, music, etc.), content source (e.g., TV channel, internet content provider, cable provider, video-on-demand provider, pay-per-view provider, music source, etc.), genre (e.g., drama, comedy, action, sports, etc.), and media format (e.g., TV broadcast, video-on-demand, audio, etc.), time of recording (e.g., primetime, weekends, etc.). By determining which media assets are likely to be recorded, the system may more accurately determine the projected storage availability of the recording device over time in the future.

For example, a recording device (e.g., DVR) may determine that a user of the device frequently records media assets of a particular media category (e.g., TV shows such as Mad Men, Grey's Anatomy) in a particular genre (e.g., drama) that are broadcast during a particular time frame (e.g., between 8:00 PM EST and 10:00 PM EST on weekends). Consequently, the device may deduce that a newly available media asset of the same media category (e.g. TV) and genre type (e.g., drama) that is scheduled to be broadcast within that particular time frame (e.g., 9:00 PM EST on Saturday night) will be likely be recorded at the broadcast time. In another example, a recording device may determine that a user of a device frequently deletes and/or cancels recordings of a particular media category (e.g., movies, music) before deleting and/or canceling recordings of another media category (e.g., TV shows). Consequently, the device may deduce that if the storage availability is running low, the user is likely to delete media assets of a particular category (e.g., movies, music) to make space available on the device before resorting to deleting media assets of another media category (e.g., TV shows).

The systems and methods described may also provide for employing other techniques to determine the storage availability over time. These techniques may be performed separately or in combination with all techniques described in the present disclosure to determine storage availability. In some embodiments, the systems and methods described may provide for determining the storage availability of a recording device over time by computing a rate of storage usage. In particular, a rate of storage usage may be computed for a particular TV series. To compute the rate of storage usage for a particular time in the future (e.g., the time selected by the user through the visualization graphic), the system may determine whether an episode in the series is scheduled to be recorded at the particular future time. In order to compute the rate of storage for a TV series, a storage time of an episode in the series may be identified. This time duration may be identified by determining how long a previously recorded episode in the series was stored on the recording device before being deleted. Together, the determination of whether an episode is scheduled for recording at the particular future time, in conjunction with the storage time duration identified for a previously recorded episode in the series, are used to compute a rate of storage usage for the TV series at the particular user-selected time in the future. In addition to being used to determine the storage availability over time, this storage usage rate may also indicate to the user which TV series are producing the most recording traffic at a particular point in time in terms of storage usage, allowing the user to manage their recordings more appropriately.

For example, the system may compute the rate of storage usage for a given TV series (e.g., Game of Thrones) at a particular time selected by the user (e.g., Sunday, June 9, 2013). The recording device may determine that an episode of the TV series (e.g., Season 3, Episode 10) may be scheduled for recording at that particular selected time (e.g., Sunday, June 9, 2013). To compute the storage rate at that particular time, the system estimates that the episode (e.g., Season 3, Episode 10) will be stored on the recording device for one week based on the fact that a previously recorded episode (e.g., Season 3, Episode 9) in the same TV series (e.g., Game of Thrones) was stored for one week on the recording device before being deleted.

More specifically, in some embodiments, the storage usage rate for the series at the particular future time may be computed by calculating an average storage rate of usage for an episode in the series using the identified storage time of a previously recorded episode and the storage space that will be occupied by another episode that is scheduled for recording at the particular future time.

For example, the system may determine that a single High Definition (HD) recording of an episode (e.g., Season 3, Episode 10 of Game of Thrones) at the particular future time (e.g., Sunday, June 9, 2013) may occupy 8 Gigabytes (GB) of memory in storage. Given that a previous episode in the series (e.g., Season 3, Episode 9) was stored on the recording device for one week before deletion, the system may compute an average storage usage rate for the TV series (e.g., Game of Thrones) to be 8.0 GB/1 week.

In some instances, this rate of storage may be computed in a similar or different manner for each TV series recorded on the device and averaged to compute an average rate of storage usage of any TV asset recorded on the device. In other instances, the method may be used to calculate the average storage rate of any type of media asset (e.g., based on category, content source, genre, media format, etc.) or any media asset, regardless of type, recorded on the recording device. This rate of storage usage may be directly presented to the user as storage management statistic and/or used to compute storage availability of the recording device over time in the future.

Once the storage availability over time is determined by the systems and methods described, it may be presented through a visualization graphic. In some embodiments, the change in storage availability over time may be visualized by using a graphic to simultaneously display the storage availability of the recording device at different times in the past, present, and future.

For example, a single graphic may be used to display the storage availability computed in the past day, the storage availability of the current day, and the projected storage availability in the next day.

In one instance, the graphic may be a line graph, where a single point in the line graph reflects the cumulative storage availability of one particular day in the week. For example, a first point may represent the total storage availability computed for yesterday, a second point may represent the storage availability computed for today based on stored recordings and scheduled recordings for the present week, and a third point may represent the projected storage availability computed for tomorrow based on analysis of storage usage activity.

In another instance, the graphic may be a bar graph, where a single bar represents the cumulative storage availability of one particular week. For example, a first bar may represent last week's storage availability, a second bar may represent this week's storage availability, and a third bar may represent next week's projected storage availability.

In yet another instance, the graphic may be a combination of a line graph, bar graph, and/or any other representation of the change of storage availability over time, wherein one or more representations may be superimposed one another.

Certain points on the visualization graph may correspond to critical states of storage availability of the recording device. Upon determining that a critical state has been reached or is approaching, the systems and methods described may provide for generating recommendations to the user to enable better management of media assets on the recording device.

In some embodiments, systems and methods described may provide for determining that the storage availability of the recording device is or will be high and generate recommendations for possible media assets to record.

For example, once the storage usage drops to 10% of the full storage capacity of the recording device, the system may generate a notification or alert informing the user that there is ample space on the recording device for more recordings and provide a list of recommended media assets that the user may be interested in recording.

In some embodiments, systems and methods described may provide for determining that the recording device is or will be reaching a full storage capacity and generate recommendations of possible media assets to delete.

For example, once the storage usage rises to 90% of the full storage capacity, the system may generate a notification or alert informing the user that full storage capacity will be reached and provide recommendations on which recordings to delete from the device. These recommendations may be made based on determinations of which recordings have already been consumed (e.g., watched, listened to) by the user.

In another example, the system may predict that the recording device will reach its full storage capacity at a particular time in the future (e.g., one week from now, 3 days from now, etc.). The user may recognize that this critical event is approaching through viewing the visualization graphic and in response, select that particular future time on the graphic. Upon selection of that time, the user may be presented with recommendations for which recordings to delete from storage.

The selection of the particular time from the graphic may be conducted by directly interacting with the graphic. Systems and methods described may provide for visually distinguish a region of the graphic corresponding to storage availability at a particular future time. Upon selection of that region, the system may present media assets associated with the storage availability calculated for that particular time.

The user may perform the selection in any way. For example, a user may use a mouse to click on a point in a line graph corresponding to the storage availability at a particular future time. In response, the system may display a list of media assets that are stored, scheduled to be recorded, and/or scheduled to be deleted at the particular time. In another example, the user may press a button on a remote control to select a portion of the visual corresponding to storage availability at a particular time. In yet another example, the user may touch a portion of a multi-touch screen that corresponds to a particular time.

After a user makes the selection corresponding to the storage availability of the recording device at a particular future time, media assets associated with that future time may be presented for the user to view and manage. Systems and methods described may provide for identifying all media assets that will be recorded and deleted at the selected future time and present indications of all the identified recordings to the user.

For example, upon user selection of a point in future time from the graphic, the user may be presented with a comprehensive list of all media assets scheduled for recording or deletion at the selected time. In some instances, these media assets may all be presented on a same display page. In other instances, some or none of the media assets may be listed, while the remaining media assets may be accessible by selecting a link on the display. Each link may point to a group of media assets that belong in a same group based on some common characteristic (e.g., media category, genre, content source, viewing frequency, etc.) so as not to overcrowd the display page.

BRIEF DESCRIPTION OF THE DRAWINGS

The above and other features of the present disclosure, its nature and various advantages will be more apparent upon consideration of the following detailed description, taken in conjunction with the accompanying drawings, and in which.

DETAILED DESCRIPTION OF EMBODIMENTS

Figure 1:
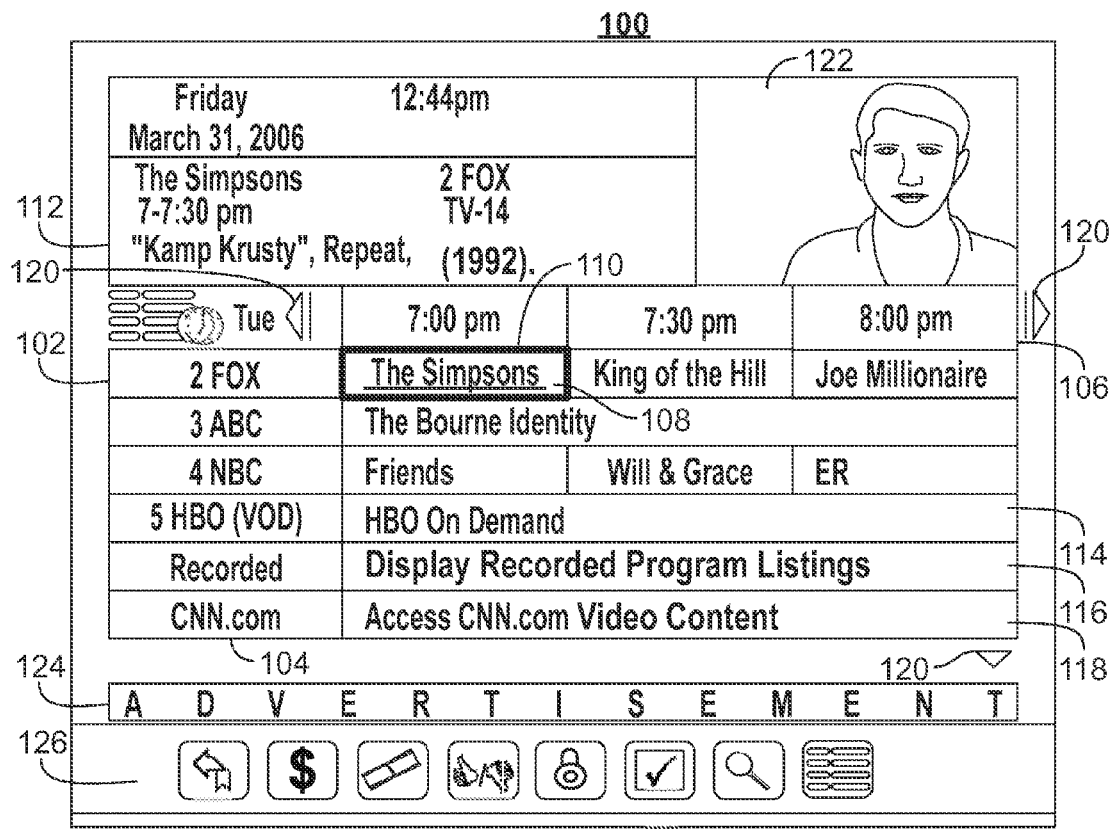
FIG. 1 is a diagram of an interactive grid display in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. Interactive media guidance applications may also include applications which allow users to manage storage usage of their user equipment devices (e.g., recording devices). These applications may visualize the storage availability of the user equipment (e.g., recording device) over time.

As referred to herein, "storage availability" and "available storage" in all their variations may be used interchangeably to refer to the amount of unused storage space remaining on a recording device. As referred to herein, the phrases "scheduled to be stored", "scheduled to be recorded", "scheduled for recording" and "scheduled recordings" in all their variations may be used interchangeably to refer to media assets which are scheduled to be recorded by direct input from the user or projected to be recorded based on predictive analysis performed by the recording device and/or a remote server. Similarly, as referred to herein, the phrases "scheduled to be deleted", "scheduled to be removed", "scheduled for deletion", and "scheduled deletions" in all their variations may be used interchangeably to refer to media assets which are scheduled to be deleted by direct input from the user or projected to be deleted based on predictive analysis performed by the recording device or a remote server. As referred to herein, "storage usage" and "storage occupied" in all their variations may be used interchangeably to refer to the amount of memory that is consumed and rendered unusable by a recording or recording activity. As referred to herein, "rate of storage usage", "rate of storage", "storage rate", and "storage usage rate" may be used interchangeably to refer to the rate at which storage is occupied by media content on a recording device. As referred to herein, the "change in storage availability over time" and "change in storage availability" in all their variations may be used interchangeably to refer to storage availability or storage usage of the recording device at different points in time.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
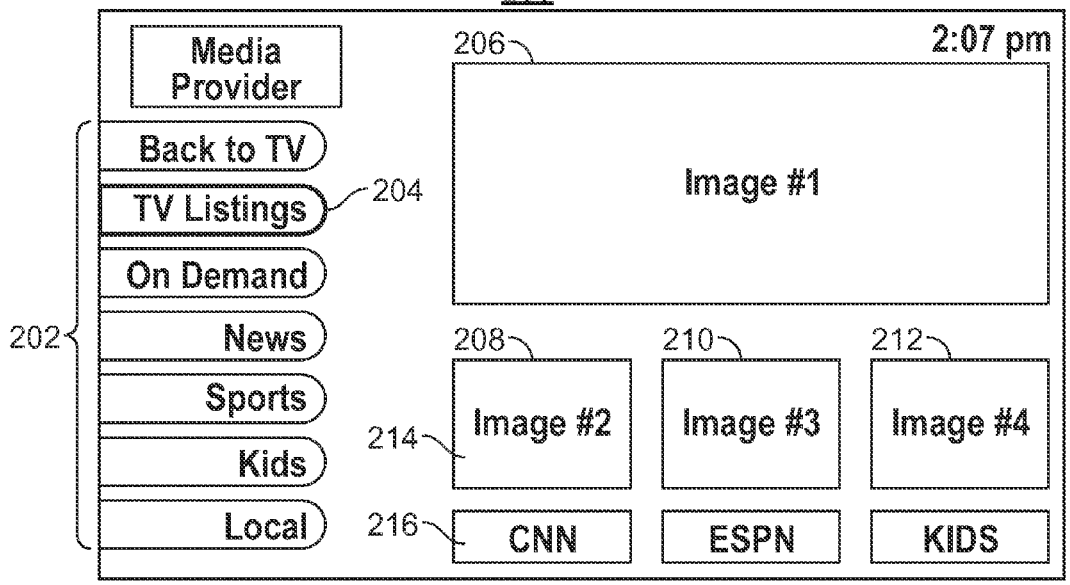
FIG. 2 is a diagram of an interactive media system in accordance with some embodiments of the disclosure.

FIGS. 1-2 show illustrative display screens that may be used to provide media guidance data. The display screens shown in FIGS. 1-2 and may be implemented on any suitable user equipment device or platform. While the displays of FIGS. 1-2 and are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other pre-defined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The user profile information, along with any other user preference information input by the user or automatically generated by the application, may be used to determine which recordings are likely to be recorded at a future time at a user equipment device (e.g., recording device). The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
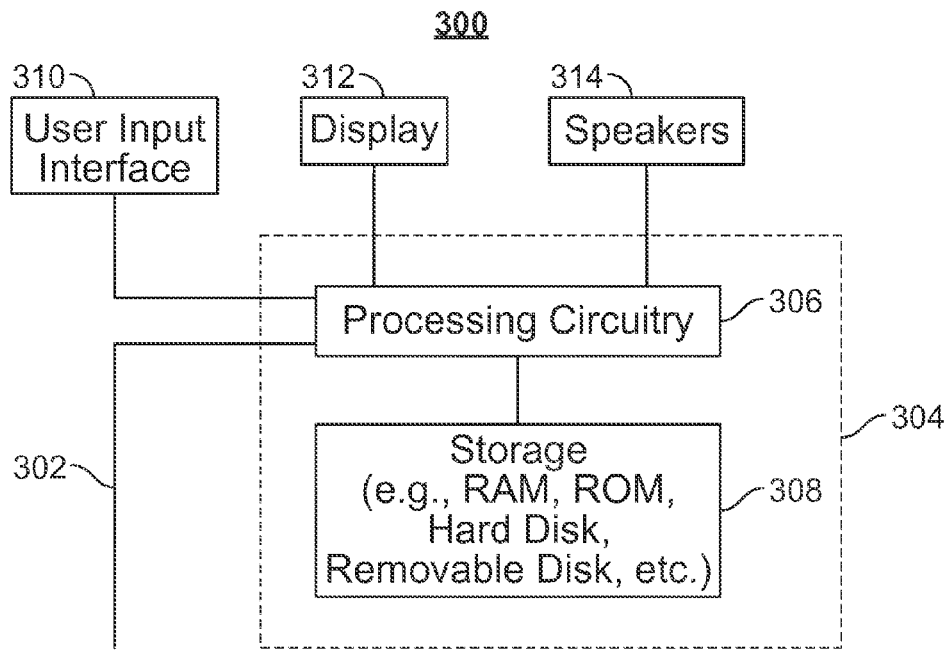
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

Additionally, the media guidance application may also provide instructions to control circuitry 304 to compute various statistics related to storage usage activity of a user equipment (e.g., recording device), as well as monitor and analyze storage usage activity and user interaction history with the user equipment 300 (e.g., recording device).

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
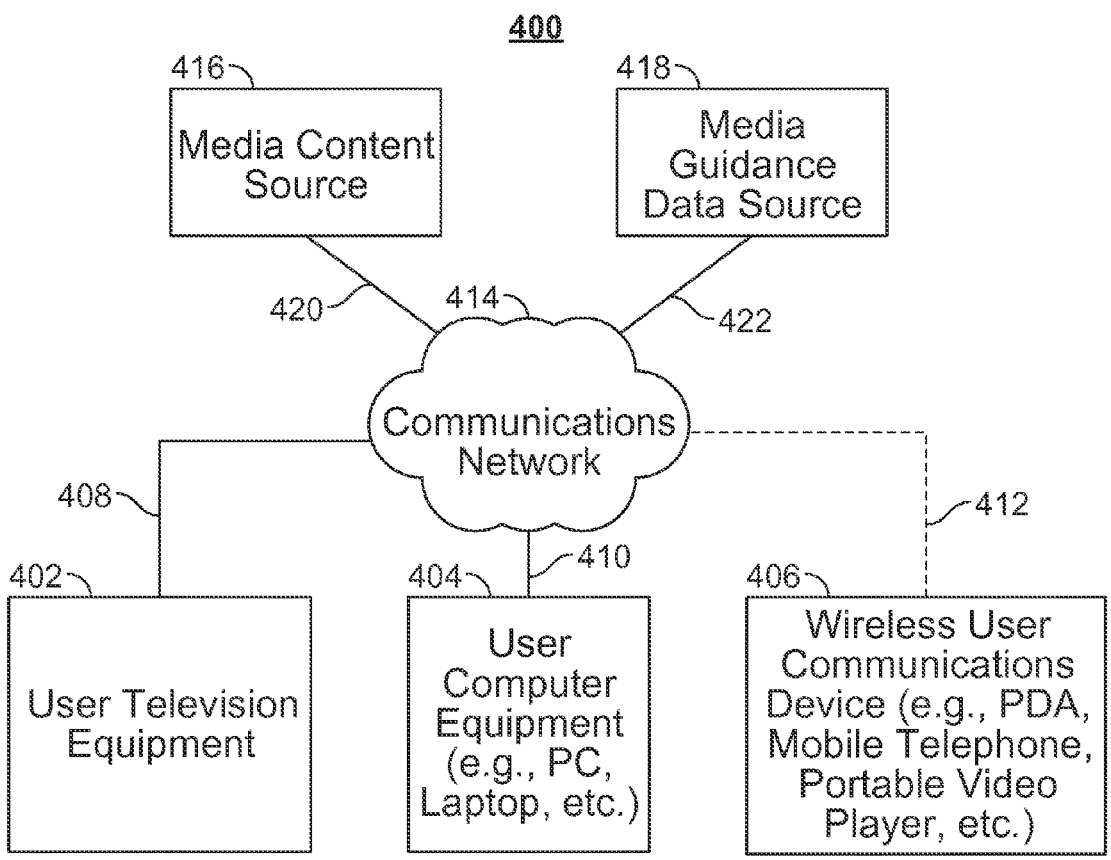
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

In some embodiments, content that is provided by media content source 416 may include metadata describing properties of the media content delivered. For example, the metadata may include, but are not limited to, the size of the content (e.g., in gigabytes (GB), megabytes (MB), kilobytes (KB), etc.), quality of recording (e.g., Standard Definition (SD), High Definition (HD), etc.), type of storage format (e.g., MPEG-4, MPEG-2, MPEG-1, CCIR 601, H.261, H.263, H.264, etc.), and rate at which the media content is delivered to a user equipment device (e.g., Mbps, Gbps, Kbps, etc.).

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, media guidance data source 418 may perform analysis of the storage usage activity on a user equipment device 300 (e.g., recording device). Various components of the storage usage activity may be delivered as media guidance data to user equipment device 300 over communication path 302 via communications network 414. The storage usage activity may include, but is not limited to, recording history of media assets, currently scheduled recordings of media assets, deletion history of media assets, currently scheduled deletions of recordings, and cancelation history of scheduled recordings.

In some embodiments, data source 418 may deliver results of analyzing the storage usage activity to user equipment device 300. These results may include, but are not limited to, media assets that are likely to be recorded, deleted, and/or canceled from scheduled recording at a particular time in the future, recommendations for which media assets to delete and/or record at a particular future time, storage usage statistics for the user equipment device 300 at a particular time frame related to any type of storage usage activity, user preferences for recording, deleting, viewing, canceling recordings, and patterns of recording, deleting, viewing, and canceling recordings at user equipment device 300.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some instances, certain user equipment devices such as recording devices may be scheduled to record more media content than they can store at one time. In these instances, a user may desire a storage management tool that will help the user manage recordings well in advance so that desired media content will still be recorded while not overloading the recording device. As described herein, systems and methods for visualizing storage availability of a recording device over time are described which allow a user to more proactively plan and manage their recordings.

Figure 5:
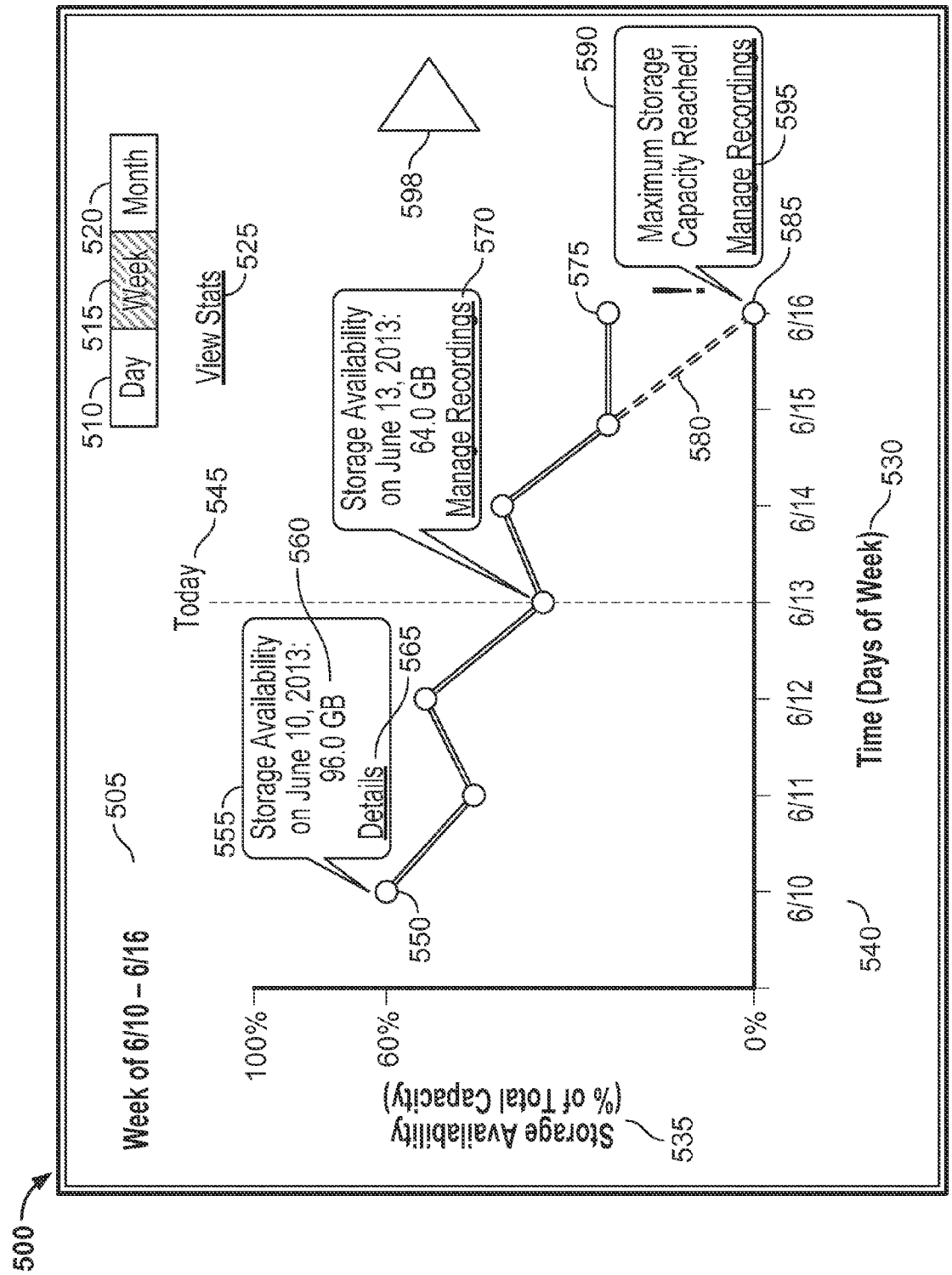
FIG. 5 is an illustrative graphic visualization of the change in storage availability of a recording device over time in accordance with some embodiments of the disclosure.
Figure 6:
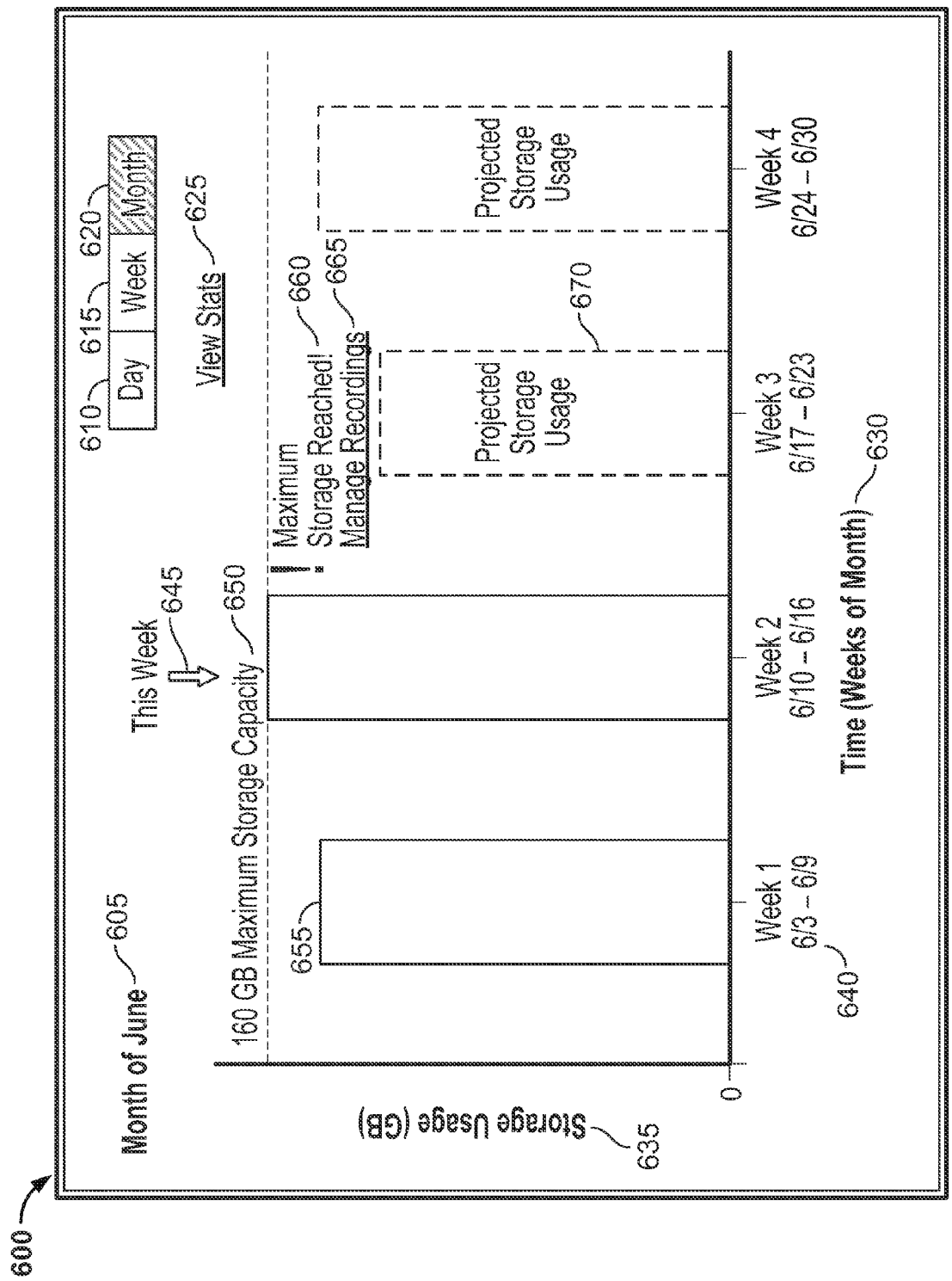
FIG. 6 is another illustrative graphic visualization of the change in storage availability of a recording device over time in accordance with some embodiments of the disclosure.

FIG. 5 shows an illustrative graphic visualization 500 of the change in storage availability of a recording device over time in accordance with some embodiments of the disclosure. Graphic visualization 500 may show the change in storage availability over time using a line graph. The line graph may plot storage availability of the recording device at different points in time within a set time frame, as shown in title 505 (e.g., one week time frame corresponding to the week of June 10, 2013-June 16, 2013). The line graph may contain an x-axis and y-axis, wherein the x-axis is labeled with a time metric 530 (e.g., days of the week) and the y-axis is labeled with a metric of storage availability 535 (e.g., percentage of total capacity remaining on the recording device). As referred to herein, time frames represented by the graphic visualization may be measured by any metric. The time metric may include, but is not limited to, minutes of an hour or day, hours of a day, days of a week, and weeks of a month (e.g., as shown by label 630 in FIG. 6), wherein time frame represented by title 505 is accordingly adjusted to reflect the time metric 530 used (e.g., as shown in FIG. 6, the time metric label 630 is in weeks of a month in June, so the time frame represented by title 605 corresponds to the month of June).

Control circuitry 304 may receive user selection of a particular granularity of time 515 (e.g., week) through a time frame option bar (comprising options 510, 515, and 520). Different time frames may be chosen, including but not limited to, the time frame of a particular day 510, week 515, or month 520. Control circuitry 304 may instruct display 312 to visually distinguish the time frame granularity (e.g., highlight, outline, shade, etc.), as shown by shaded option 515. The selection may be a default selection or instantaneous selection made by the user. In response to determining selection of a given time frame granularity, control circuitry 304 may modify the time metric label 530 on the x-axis and the title 505 to reflect the selected time granularity. For example, as shown in FIG. 5, the current selected time granularity is a week. Accordingly, control circuitry 304 generates for display the time on the x-axis to be measured as days of a week. Additionally, control circuitry 304 generates for display the title of graphic visualization 500 to correspond to the time frame of a week (e.g., "Week of 6/10/13-6/16/2013").

Similarly, the storage availability label 535 shown on y-axis 535 may also be measured by any metric. As referred to herein, storage availability may be measured by how much storage space is used (e.g., label 635 in FIG. 6) or how much storage space is remaining (e.g., label 535 in FIG. 5) on recording device 300. As referred to herein, storage availability may be measured by actual memory size (e.g., KB, MB, GB) or a percentage of total storage capacity, as shown in label 535. In embodiments where storage availability is visualized in terms how much storage is used (see FIG. 6), control circuitry 304 may generate an additional label (e.g., label 650 "160 GB maximum storage capacity" in FIG. 6) indicating a numerical value for the maximum storage capacity of recording device 300.

Control circuitry 304 may instruct display 312 to display the graphic visualization. In some embodiments, display 312 may also be a user input interface 310, wherein a user may input selections by selecting a portion of the display. Control circuitry 304 may receive a user selection of one of the points 550 on the line graph corresponding to storage availability at a particular time. In response to receiving user selection of any point of graphic visualization 500, control circuitry 304 may generate further information relating to the storage availability at the time corresponding to the selected point. Control circuitry 304 may instruct display 312 to display this further information as a pop-up image, text, alert, notification, or separate window overlaying the visualization 500. In some embodiments, control circuitry 304 may instruct display 312 to display a portion of the further information as an overlay of graphic visualization 500, while making the remaining portion of the future information accessible to the user via a selectable option.

For example, control circuitry 304 may receive user selection of point 550 on the line graph corresponding to particular time in the past 540 (e.g., Monday, June 10, 2013). In some embodiments, in response to user selection of point 550, control circuitry 304 may fetch the actual storage availability (e.g., 96.0 GB) of the recording device at the selected time (e.g., June 10, 2013) as part of the further information 555. Control circuitry 304 may instruct display 312 to display the further information as a pop-up textual overlay 555. In some embodiments, control circuitry 304 may generate a selectable option 565 ("Details") which allows a user to view further details about the storage availability associated with the selected time 540. In response to receiving user selection of selectable option 565 ("Details"), control circuitry 304 may instruct display 312 to display another interface showing media assets that were stored, scheduled for recording, and/or scheduled for deletion at the selected past time 540. An illustrative interface 700 is further discussed in relation to FIG. 7.

Control circuitry 304 may also or alternatively receive user selection of a point on the line graph corresponding to storage availability at the present time, as denoted by marking 545 (e.g., dotted line marking which day is "Today"). Control circuitry 304 may receive user selection of a point corresponding to the present time. In response to receiving user selection of such a point, control circuitry 304 may generate further information about the storage availability at the selected time as an overlay of visualization 500 and a selectable option 570 ("manage recordings") to manage recordings associated with the selected present time. In response to receiving user selection of option 570, control circuitry 304 may instruct display 312 to display a storage management interface. An illustrative storage management interface 8 will be further discussed in relation to FIG. 7.

Control circuitry 304 may also or alternatively receive user selection of a point in the line graph corresponding to storage availability at a future time. The selected point may correspond to a future time which is associated with scheduled recordings and/or a future time (e.g., point 575, point 585) which is not associated with scheduled recordings, but rather projected recordings. Control circuitry 304 may compute the storage availability for a particular future time based on projections about stored recordings, scheduled recordings, scheduled deletions of recordings at that particular future time, a rate of storage usage (e.g., average rate of recording), and/or rate of consumption of recordings (e.g., average rate of watching a recorded media asset). In some embodiments, if no recordings are scheduled to be recorded or deleted at the particular future time, control circuitry 304 may compute the storage availability to remain the same (e.g., point 575) as the storage availability computed for the previous point in time.

In some embodiments, control circuitry 304 may additionally or alternatively compute a projected storage availability of recording device 300 at the future time (e.g., 585) based on a determination of which media assets are likely to be recorded, deleted, and/or canceled at the particular time. Control circuitry 304 may make this determination based on analysis of historical storage usage activity and/or user interaction history with recording device 300. In one instance, this analysis may be performed wholly by local control circuitry 304 on recording device 300. In another instance, this analysis may be performed wholly by a remote server residing at media guidance data source 418. In yet another instance, this analysis may be performed by a combination of both local and remote circuitry, wherein local recording device 300 may send and receive information to and from a remote server over communication path 302 via communications network 414. The determination of which media assets are likely to be recorded, deleted, and/or canceled may be made based on analysis of viewing history of a related media asset, recording history of a related media asset, deletion history of a related media asset, cancelation history of a related media asset, user preference of a related media asset, the media asset type, and the user's recording pattern of media assets. Details of this prediction analysis are further discussed in U.S. Pat. No. 8,160,462 "Storage Management of a Recording Device in a Multi-User system", which is incorporated herein by reference in its entirety. Because the computation of storage availability may not be wholly based on actual recordings or scheduled recordings but rather projected based on predictive analysis, control circuitry 304 may instruct display 312 to display the "projected" change in storage availability as a dotted line 580.

As part of the process of computing storage availability of recording device 300, control circuitry 304 may identify certain points as critical states in storage availability and display the criticality of these states on display 312. For example, control circuitry 304 may project that recording device 300 will reach a critical storage capacity (e.g., maximum storage capacity) at a particular time in the future 585 and identify that future time 585 as a critical state. In response to identifying the future time as a critical state, control circuitry 304 may instruct display 312 to display an alert indicator representing the criticality of the storage state. The alert indicator may include an exclamation mark (as shown next to point 585, a color indicator (e.g., red or any other color representing critical storage status), or any other graphical representation alerting a user to important storage-related information. Control circuitry 304 may also generate for display an overlay of further information similar to further information overlay 555 as previously discussed) notifying the user that a critical storage capacity (e.g., maximum storage) will be reached and allowing the user to manage recordings through selection of an option 595. In some embodiments, in response to receiving user selection of option 595, control circuitry 305 may instruct display 312 to display a storage management interface. An illustrative storage management interface 800 will be further discussed in relation to FIG. 8.

In some embodiments, control circuitry 304 may determine that recording device 300 does not have sufficient storage availability to perform all scheduled recordings and/or retain all currently stored recordings. Upon user selection (e.g., hover, click, etc.) of the critical storage state 585, control circuitry 304 may instruct display 312 to display a list (e.g., as part of further information overlay 590) of media assets which will be automatically deleted and/or scheduled recordings which will be automatically canceled to accommodate other scheduled recordings. In these instances, media assets which will be automatically deleted and/or scheduled recordings which may be automatically canceled may be shown in a first color (e.g., red) to indicate removal at the corresponding time (e.g., 6/16), whereas media assets which will be recorded or stored will be displayed in a second color (e.g., green) to indicate storage on recording device 300. The list of media assets (with or without color indications) may help users of recording device 300 to more easily visualize critical states of storage usage/availability and furthermore, which recordings will be recorded, kept, and/or deleted at various points in time.

Control circuitry 304 may receive user selection of an option 598 to view the storage availability of recording device 300 at further points in future time. This viewing option may allow a user to manage recordings well in advance so that desired recordings may not be missed due to storage overload. In response to receiving selection of option 598 (e.g., navigation option), control circuitry 304 may generate another graphic visualization (not shown, but similar to visualization 500) showing the change in storage availability in further points in future time (e.g., next week of 6/17/2013-6/24/2013).

In some embodiments, control circuitry 304 may receive user selection of an option 525 (e.g., "View Stats") to view aggregate storage usage statistics of recording device 300. Alternatively, control circuitry 304 may instruct display 312 to display a portion of or all the storage usage statistics on directly on visualization 500. In response to receiving user selection of option 525, control circuitry 304 may instruct display 304 to display a statistics interface. An illustrative statistics interface 900 is further discussed in relation to FIG. 9.

FIG. 6 shows another illustrative graphic visualization 600 of the change in storage availability of a recording device over time in accordance with another embodiments of the disclosure. FIG. 6 comprises all the features and functionalities of FIG. 5, except that the visualization of storage availability is represented by a bar graph instead of a line graph (as shown in FIG. 5). Instead of having selectable points on a line graph corresponding to storage availability at a particular point in time (as shown in FIG. 5), graphic visualization 600 uses selectable bars (e.g., bar 655) of a bar graph, wherein a given bar corresponds to storage availability of recording device 300 at a particular time.

In some embodiments, the bars (e.g., 655, 670) may be further segmented (not shown) by media assets or categories of media assets that have been scheduled for recording, scheduled for deletion, and/or are currently stored on recording device 300 at a corresponding time period (e.g., 640). For example, a bar (e.g., 655, 670) may be visually segmented such that it is composed of a plurality of blocks, wherein each block corresponds to the storage usage of a given media asset or category of media assets at the corresponding time period (e.g., 640). In some cases, the storage usage computed for a given time (e.g., 640) may exceed the maximum storage capacity of recording device 300. In such instances, the bar (e.g., 655, 670) may rise above the capacity line 650, wherein the portion of the bar exceeding the capacity line 650 is segmented into one or more blocks of media assets which will automatically be deleted in order to accommodate the other scheduled recordings. In some instances, control circuitry 304 may instruct display 312 to display the segment of the bar which corresponds to scheduled deletions of media assets in a first color (e.g., red) in order to indicate its pending deletion, whereas segments corresponding to media assets that will be stored or recorded at the corresponding time (e.g., 640) will be instructed by 304 to be displayed in a second color (e.g., green). These segmented bars (with or without color indications) may help users of recording device 300 to more easily visualize critical states of storage usage/availability and furthermore, which recordings will be recorded, kept, and/or deleted at various points in time.

Furthermore, instead of dotted lines (e.g., 580 in FIG. 5) representing projected change in storage availability over time, FIG. 6 shows dotted bars. These bars (e.g., 670) may be labeled with text indicating that the bar represents storage availability that is determined based on projected calculations, rather than actual recordings and/or scheduled recordings alone. In response to receiving user selection of a bar (e.g., 670) corresponding to projected storage availability at a future time, control circuitry 304 may instruct display 312 to display another interface allowing the user to schedule and/or remove projected recordings associated with that future time. An illustrative interface 800 will be further discussed in relation to FIG. 8.

Figure 7:
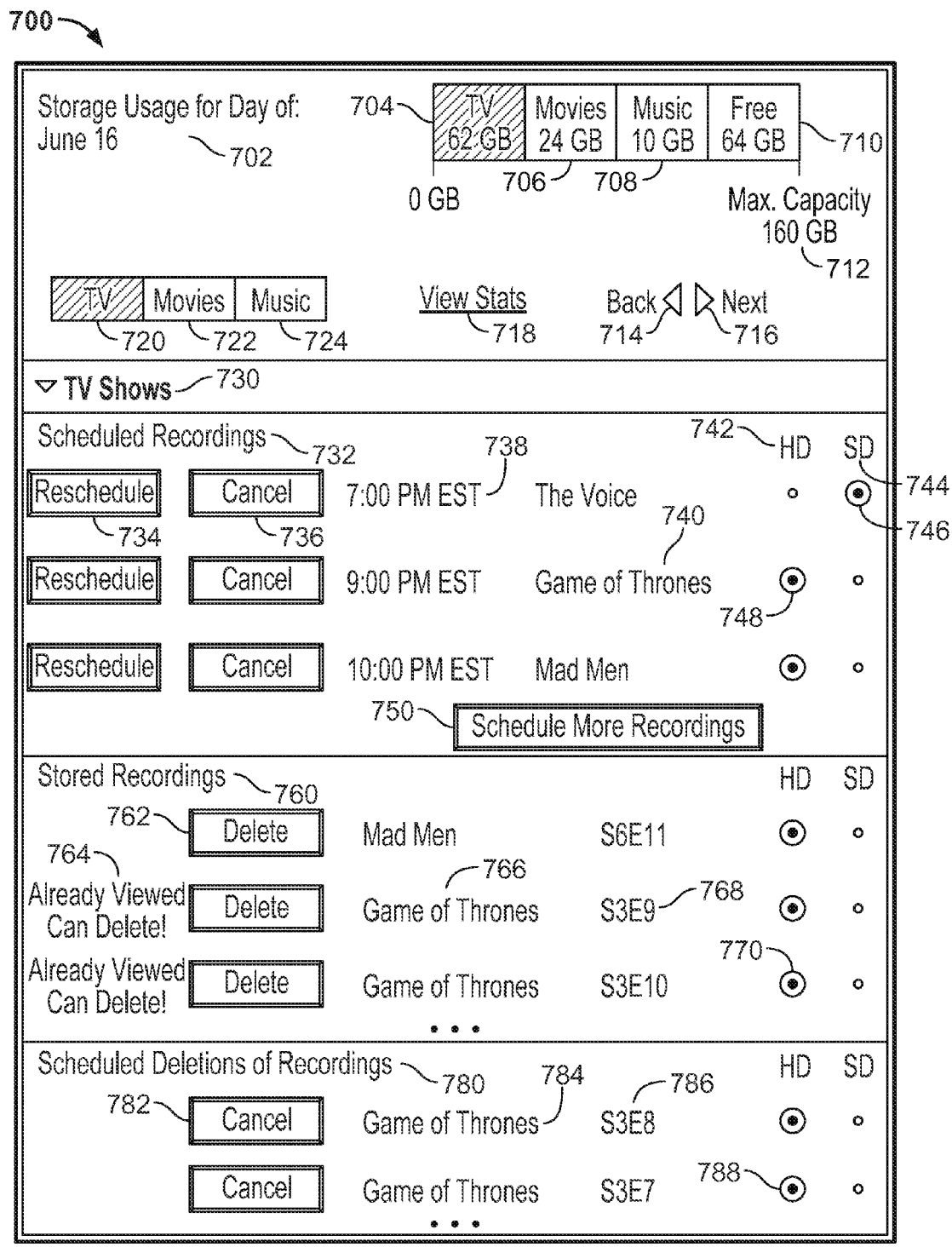
FIG. 7 is an illustrative interface presenting media assets associated with storage availability at a particular user-selected time in the past or present in accordance with some embodiments of the disclosure.

FIG. 7 is an illustrative storage management interface 700 presenting media assets associated with storage availability at a particular user-selected time in the past or present in accordance with some embodiments of the disclosure. To provide context for the media assets that are presented to the user, control circuitry 304 may instruct display 312 to display the user-selected time 702 as part of the title of interface 700.

In some embodiments, control circuitry 304 may identify all media assets that are stored, scheduled to be recorded, and/or scheduled to be deleted at the user-selected time 702 and retrieve all indications of the identified media assets from storage. These indications may include but are not limited to pointers to each or all of the identified media assets, a list of the names of the identified media assets, and hyperlinks to each or all of the identified media assets.

In another embodiment, control circuitry 304 may identify all the media assets but only retrieve a indications for a subset of the identified media assets. Control circuitry 304 may determine which indications to retrieve based on which media category setting has been selected (e.g., TV setting 720, movie setting 722, music setting 747). For example, as shown in FIG. 7, control circuitry 304 may determine that the current selected media category setting is TV setting 720. In response to determining the current media category, control circuitry 304 may only retrieve indications for TV assets that are currently stored in storage 308, scheduled for recording, and/or scheduled for deletion from storage 308 of recording device 300. Alternatively, if control circuitry 304 determines that the current selected media category setting is movie setting 722, control circuitry 304 may only retrieve indications for movie assets that are currently stored in storage 308, scheduled for recording, and/or scheduled for deletion from storage 308 of recording device 300.

Alternatively, control circuitry 304 may only identify a subset of media assets based on which media category setting has been selected (as described above) and retrieve indications for all the identified subset of media assets.

In one embodiment, control circuitry 304 may retrieve the indications from local storage 308. In another embodiment, control circuitry 304 may retrieve the indications from a remote server (e.g., residing on a media guidance data source 418) via communication path 302 over communications network 414. In yet another embodiment, control circuitry 304 may retrieve the one or more media assets from a combination of local and remote storage.

Upon retrieval of the indications of identified media assets, control circuitry 304 may instruct display 312 to display representations of the media assets corresponding to the retrieved indications in sections 732 (scheduled recordings), 760 (stored recordings), and 780 (scheduled deletions of recordings) of interface 700.

As discussed, control circuitry 304 may determine which media assets to ultimately present to the user in interface 700 based on which media category setting is selected. In some embodiments, the media category selection may be made via user selection of a storage usage breakdown visualization. In these embodiments, control circuitry 304 may generate for display on display 312 a storage usage breakdown visualization indicating the breakdown of storage usage for various types of media assets. As shown in FIG. 7, the storage usage breakdown visualization may be broken down into storage allocated for TV assets 704, movie assets 706, music assets 708, and remaining free storage 710. The visualization may also include a marker 712 indicating the maximum storage capacity of recording device 300 (e.g., "max capacity 160 GB). The storage breakdown visualization in FIG. 7 shows one illustrative embodiment of how the storage usage may be broken down. In other embodiments, the visualization may represent the storage breakdown in any other manner, including but not limited to storage breakdown by media genre, content source, and media format. Furthermore, each block of storage usage (e.g., 704, 706, 708, 710) may be measured in terms of size of storage space (e.g., in KB, MB GB) or percentage of maximum storage capacity used (not shown). Control circuitry 304 may receive user selection of any of the storage usage blocks (e.g., 704, 706, 708).

In some embodiments, control circuitry 304 may additionally or alternatively determine the media category setting through user selection of a media category setting option bar (comprising options 720, 722, 724). The media category setting option provides a category context for which media assets are presented in sections 732, 760, 780 of interface 700. In some instances, control circuitry 304 may automatically toggle a media category setting option (e.g., TV category setting 720) in response to receiving user selection of one (e.g., TV storage usage 704) of any of the storage usage categories (e.g., 704, 706, 708) of the storage usage breakdown visualization bar. In other instances, control circuitry 304 may toggle a media category setting option (e.g., 720, 722, 724) in response to receiving user selection of the media category setting option (e.g., 720). Additionally, control circuitry 304 may set a default media category setting based on which category of media assets are most frequently recorded and/or viewed by the user. For example, control circuitry 304 may determine that TV shows are the most recorded media assets on recording device 300. In response to this determination, control circuitry 304 may set the default media category setting as TV setting 720. The user may change the media category setting to view additional media assets that are stored, scheduled to be stored, and/or scheduled to be deleted at the selected time 702 by selecting any of options 720, 722, 724, 704, 706, and 708.

Control circuitry 304 may instruct display 312 to display indications for media assets scheduled to be recorded at the selected time 702 in section 732 ("Scheduled Recordings") of interface 700. For each of these media asset indications, control circuitry 304 may generate for display information and options related to the recording of the media asset. The information may be retrieved by control circuitry 304 as part (e.g., metadata) of the retrieved indication. Control circuitry 304 may generate for display an option 734 to reschedule a scheduled recording, an option 736 to cancel a scheduled recording, and/or an option to change the recording quality (e.g., High Definition (HD) recording option 742, Standard Definition (SD) recording option 744). In response to receiving user selection of option 734 ("reschedule"), control circuitry 304 may instruct display 312 to display an overlay or separate screen providing different time options at which to record the media asset. Control circuitry 304 may then save the new scheduled recording time in storage 308. In response to receiving user selection of option 736 ("cancel"), control circuitry 304 may remove the corresponding media asset ("The Voice") from display in section 732. Additionally, control circuitry 304 may remove the media asset from a list of media assets scheduled for recording at selected time 702 stored in storage 308.

In addition to recording options, control circuitry 304 may also display the time 730 at which a media asset is scheduled to be recorded, the name of the media asset 740 (e.g., TV series name "Game of Thrones), and information related to the type of recording quality which has been selected (e.g., SD selection 746, HD selection 748) for the scheduled recording. For example, in response to receiving user selection 746 (SD recording selection), control circuitry 304 may retrieve the SD version of the recording at scheduled time 738. In response to receiving user selection 748 (HD recording selection), control circuitry 304 may retrieve the HD version of the recording at the scheduled time.

In some embodiments, control circuitry 304 may generate for display on display 312 an additional option 750 to schedule more recordings. In response to receiving user selection of option 750, control circuitry 304 may instruct display 312 to display another interface allowing a user to select and/or search additional media assets to record. An illustrative interface 1000 will be further discussed in relation to FIG. 10.

Control circuitry 304 may instruct display 312 to display indications for media assets already stored on recording device 300 at the selected time 702 in section 760 ("Stored Recordings") of interface 700. As in section 732 ("Scheduled Recordings), control circuitry 304 may generate for display on display 312 the name of a media asset 766, additional identifying information 768 (e.g., season and episode number of a TV series) for a media asset, and/or the recording quality of the recorded media asset 770. Additionally, control circuitry 304 may generate for display an option 762 to delete a stored recording. In some embodiments, control circuitry 304 may determine that a stored recording has already been viewed by the user. In response to this determination, control circuitry may generate text 764 suggesting that the already viewed media asset be deleted, in order to free up storage space. In response to receiving user selection of option 762 ("delete") for a media asset, control circuitry 304 may delete the recording of the media asset and/or additional metadata associated with the media asset from storage 308.

Control circuitry 304 may instruct display 312 to display indications for media assets scheduled for deletion at the select time 702 in section 780 ("Scheduled Deletions of Recordings") of interface 700. As in section 760, control circuitry 304 may display the name of the media asset 784, additional identifying information about the media asset 786, and recording quality of the media asset. Additionally, in some embodiments, control circuitry 304 may generate for display an option 782 to cancel the scheduled deletion of a recording. These deletions of recordings may have been manually scheduled by a user or automatically scheduled by recording device 300. For example, in response to determining that storage 308 may not have enough space to store all currently stored recordings and scheduled recordings, control circuitry 304 may automatically schedule certain stored media assets (e.g., as shown in section 760) for deletion and/or cancel certain scheduled recordings (e.g., as shown in section 732). To countermand the automatically generated list of scheduled deletions, a user may manually cancel a scheduled deletion. In response to receiving user selection of option 782 ("cancel"), control circuitry 304 may remove the media asset from a list of media assets scheduled for deletion at time 702. Control circuitry 304 may retrieve this list from storage 308, perform the appropriate deletion, and resave the updated the list to storage 308.

As part of interface 700, control circuitry 304 may provide additional navigational options 714 ("Back"), 716 ("Next"), and/or 718 ("View Stats"). In response to receiving user selection of option 714 ("Back"), control circuitry 304 may instruct display 312 to display a storage usage interface (similar to FIG. 7) for the previous time point (e.g., day before the selected time 702). In response to receiving user selection of option 716 ("Next"), control circuitry 304 may instruct display 312 to display a storage usage interface (similar to FIG. 7) for the next time point (e.g., day after the selected time 702). In response to receiving user selection of option 718, control circuitry 304 may instruct display 312 to display an statistics interface about storage usage for the selected time 702. An illustrative statistics interface will be further discussed in relations to FIG. 9.

Though not shown in FIG. 7, control circuitry 304 may additionally generate for display the storage usage value (e.g., measured in size of storage space or percentage of total storage capacity) for each of the media assets presented to the user in interface 700. For example, media asset 740 ("Game of Thrones") may be displayed next to a storage usage value of 8.0 GB (not shown) because an HD recording of the asset 740 may take up 8.0 GB of storage space. In response to receiving user input to cancel the scheduled recording of 740, control circuitry 304 may recalculate the storage usage values that are used to generate the storage usage breakdown visualization, namely component 704 (storage allocated to TV assets), to reflect a reduced storage allocation (e.g., previous storage allocation for TV assets minus 8.0 GB). These storage usage values may better inform the user about which assets to delete, cancel, and/or keep for recording.

Figure 8:
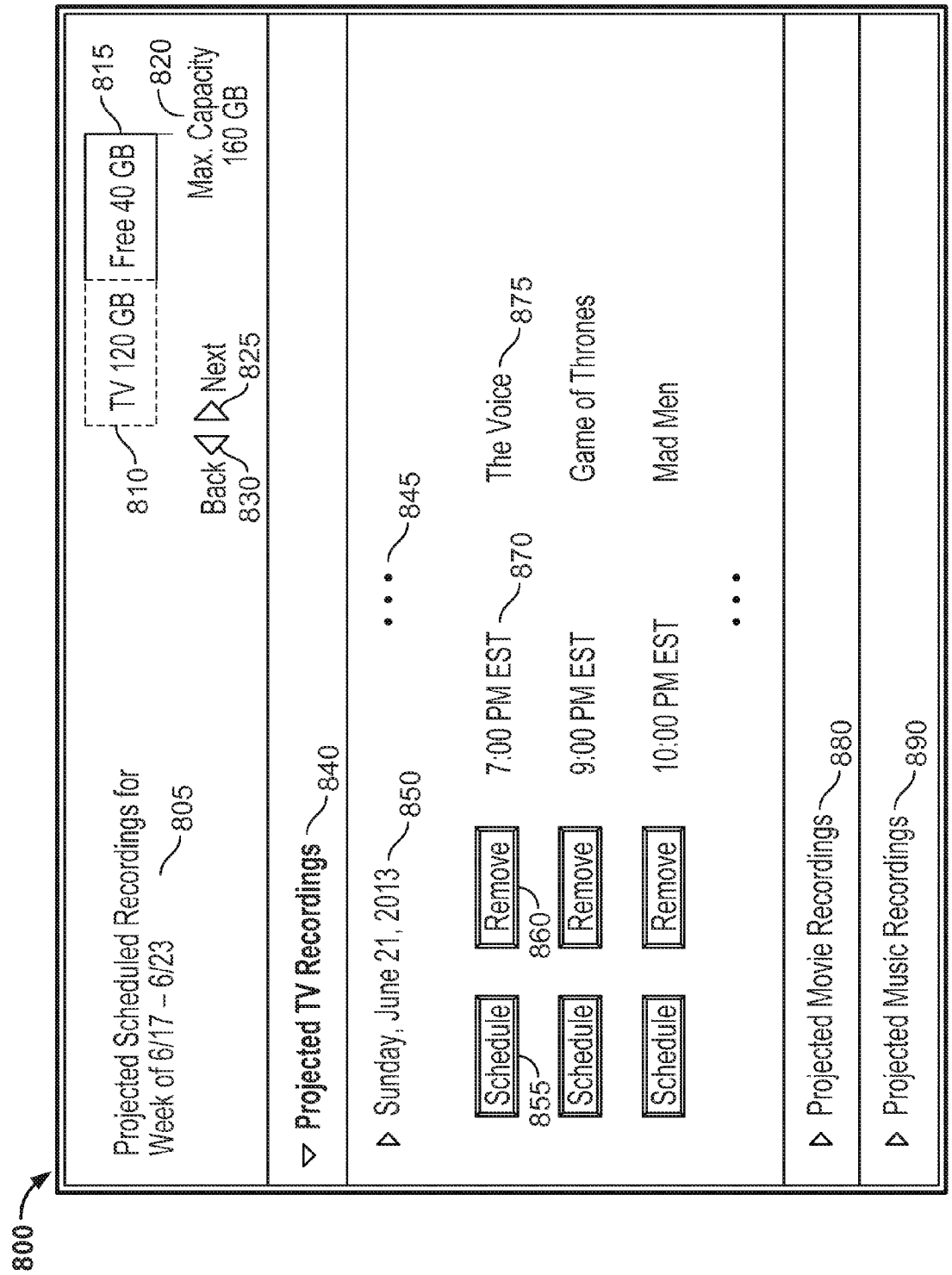
FIG. 8 is an illustrative interface presenting media assets associated with storage availability at a particular user-selected time in the future in accordance with some embodiments of the disclosure.

FIG. 8 shows an illustrative storage management interface 800 presenting media assets associated with storage availability at a particular user-selected time in the future in accordance with some embodiments of the disclosure. Interface 800 may contain all the features and functionalities presented in interface 700 in FIG. 7. For example, though not shown, interface 800 may present media assets that are scheduled to be recorded, scheduled to be deleted, or canceled from scheduled recording (as in sections 732, 760, 780 of interface 700) within the user-selected time frame 805. Interface 800 may also provide selectable media category setting options (e.g., 720, 722, 724), selectable storage usage breakdown visualization of projected storage availability (e.g., comprising components 810, 815, 820, similar to 704, 710, 712 in interface 700), selectable option to view statistics (e.g., 718), selectable option to advance a time frame ("Next" option 825), and selectable option to move back a time frame ("Back" option 830).

Additionally, interface 800 may also present recordings that are projected to be recorded at the user-selected time. Control circuitry 304 may instruct display 312 to display these projected recordings in different sections of interface 800 based on which media category they fall into. For example, control circuitry 304 may generate for display projected TV recordings in section 840, projected movie recordings may be presented in section 880, and projected music recordings may be presented in section 890. Within each section, control circuitry 304 may further split up the display of the recordings based on time. In some embodiments, control circuitry 304 may receive user selection of menu item 850 corresponding to a particular point in time (e.g., Sunday, June 21, 2013) within selected time frame 805. In response to receiving selection of 850, control circuitry 304 instruct display 312 to display an expand list of project recordings for time 850. For each of the project recordings, control circuitry 304 may generate for display a selectable option 855 to schedule the projected recording and/or a selectable option 860 to remove the recording from the list of projected recordings. In response to receiving user selection of option 855 ("schedule"), control circuitry 304 may add the corresponding media asset ("The Voice") to a list of scheduled recordings for time 850, as stored in storage 308. In response to receiving user selection of option 860, control circuitry 304 may remove corresponding media asset ("The Voice") from a list of project recordings stored in storage 308.

Additionally, control circuitry 304 may re-compute the projected storage availability for time frame 805 based on this removal so that the newly computed projected storage availability does not include storage occupied by the removed media asset ("The Voice"). Subsequent to performing this new computation of storage availability, control circuitry 304 may instruct display 312 to re-render the updated storage availability in the storage breakdown visualization (e.g., 810, 815, 820). Control circuitry 304 may also receive user selection of other times 845 within time frame 802. In response to receiving such user selection, control circuitry 304 may instruct display 312 to collapse the list of currently displayed projected recordings for time 850 and instead expand the list of project recordings for another time 845. A similar process may apply to all times within sections 880 ("Project Movie Recordings") and 890 ("Projected Music Recordings"). As in interface 700, these sections may be divide based on any media characteristic. For example, each section may present media assets sharing the same media category, content source, media format, broadcast time, media genre, etc.

Figure 9:
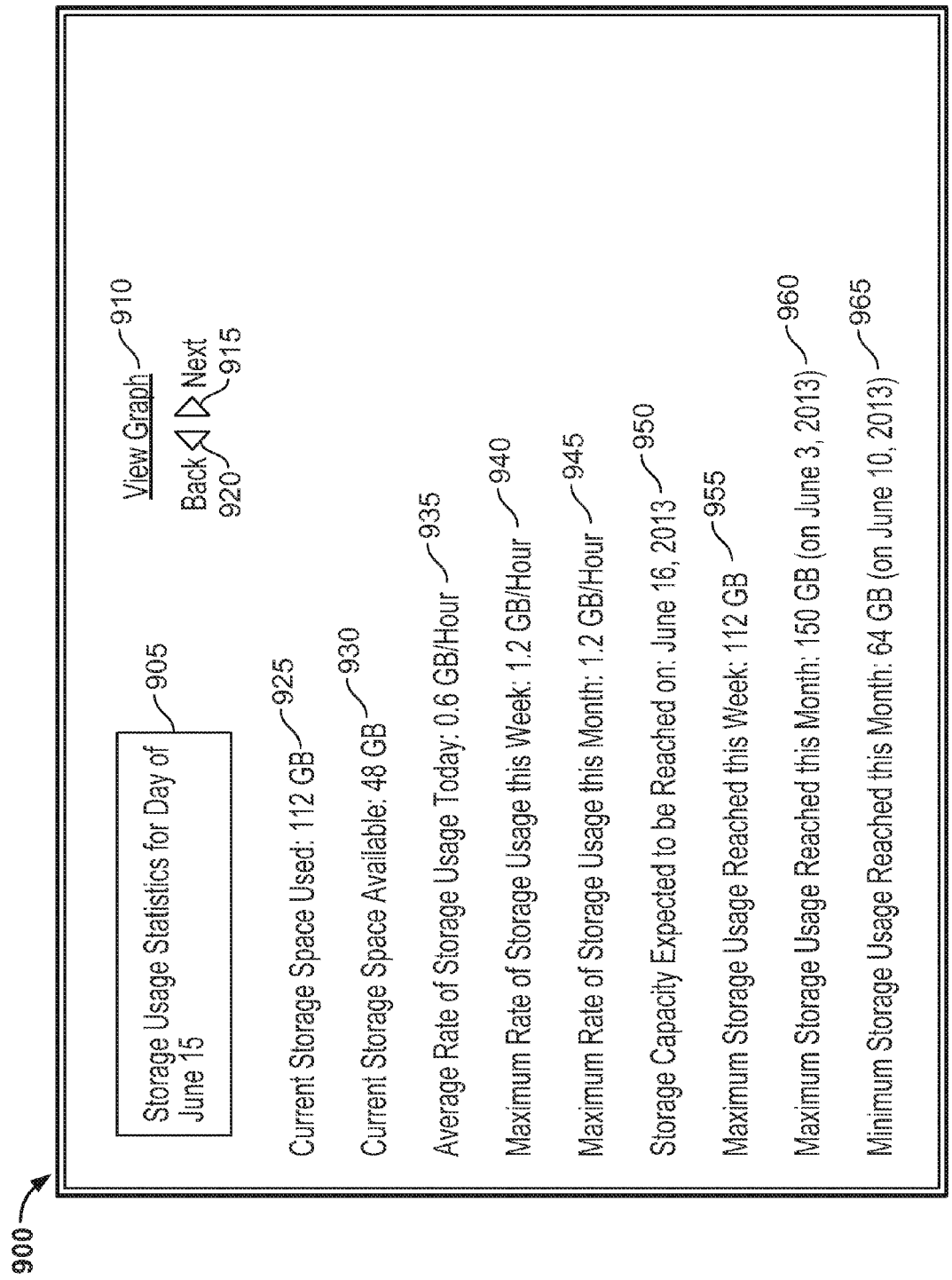
FIG. 9 is an illustrative interface presenting storage usage statistics associated with storage availability at a particular time frame in accordance with some embodiments of the disclosure.

FIG. 9 shows an illustrative interface 900 presenting storage usage statistics associated with storage availability during a particular time frame 905 in accordance with some embodiments of the disclosure. Control circuitry 304 may compute a number of storage usage statistics and instruct display 312 to display them in interface 900. The statistics that may be computed and displayed include, but are not limited to, the ones listed (e.g., 925, 930, 935, 940, 945, 950, 955, 960, 965) in illustrative interface 900.

Control circuitry 304 may compute the current storage space used 925 by determining how much of storage 308 is currently occupied by recordings and the like. Control circuitry 304 may compute the current storage space available 930 by determining how much of storage 308 is currently unused and available for storage.

The status of storage usage may be graphically represented by the use of different colors of any color scheme. For example, red may represent low storage availability, green may represent high storage availability, and yellow may represent moderate storage availability. In some embodiments, control circuitry 304 may determine that recording device 300 has reached a certain status of storage availability or usage. In response to determining that recording device 300 has reached a certain status of storage availability or usage, control circuitry 304 may instruct display 312 to display the storage value (e.g., 930, 925) in the appropriate color. Additionally or alternatively, control circuitry 304 may generate a storage usage indicator (not shown) in any of FIGS. 5-12 indicating the current storage usage/availability status of recording device 300. For example, the indicator may be a progress bar which tracks the total level of storage usage or storage availability of recording device 300. Control circuitry 304 may instruct display 312 to display the indicator in a red color if the total storage availability of recording device 300 is low, a yellow color if storage availability is moderate, and a green color if storage availability is high. Colors may also be used to indicate that a scheduled recording will require more storage space than is available on recording device 300, assuming that all previously scheduled recordings will be performed. For example, a user of recording device 300 may schedule a media asset (e.g., 740) for recording. In response to receiving user input to schedule the media asset, control circuitry 304 may determine whether recording device 300 will have enough storage space to record the media asset in its entirety. If control circuitry 304 determines that there is not enough storage space to record the newly scheduled media asset after previously scheduled recordings are performed, control circuitry 304 may instruct display 312 to display the media asset in a different color (e.g., red) to indicate to a user that recording device 300 may not be able to record the media asset in its entirety.

Additionally, in response to determining that recording device 300 may not be able to record the media asset (e.g., 740) in its entirety, control circuitry 304 may generate further options (not shown) to the user to resolve the issue of insufficient storage capacity. For example, these options may include, but are not limited to, an option to cancel a previously scheduled recording, to delete a stored recording, reschedule the new recording (e.g., 740), cancel the new recording (e.g., 740), and record the new recording at a lower resolution (e.g., SD instead of HD). Control circuitry 304 may instruct display 312 to display one or more of these options as an overlay, separate window, or embedded option in illustrative interfaces 700 and 800. The option may be similar to notification 1200, which is discussed in further detail in relation to FIG. 12.

Control circuitry 304 may compute a rate of storage usage at the present day 935, present week 940, and/or present month 945. This rate may be an average rate (e.g., 935), a maximum rate (e.g., 940), or a minimum rate of storage usage within a given time frame. Further details about how the rate of storage usage is computed are discussed in relation to FIG. 14. Control circuitry 304 may also compute a rate of recording or a rate of consumption of recorded media assets (not shown). Control circuitry 304 may compute the time at which storage 308 of recording device 300 is expected to reach its maximum storage capacity (e.g., see discussion of point 585 in FIG. 5). Control circuitry 304 may compute a maximum and/or or minimum storage usage reached at the present day (not shown), present week 955, and/or present month 960 and identify the time at which the maximum and/or minimum storage was reached. These statistic values may be computed by control circuitry 304 as a batch and then stored in storage 308. In response to receiving user selection of an option to view statistics (e.g., 525, 718), control circuitry 304 may fetch a plurality of storage usage statistics from storage 308 and instruct display 312 to display them on interface 900.

Storage usage may be displayed as a size of storage space (e.g., in KB, MB, GB) or a percentage of total storage capacity. Storage usage rate may be displayed as a size of storage space per any time metric (e.g., day, hour, minute, second).

As in interface 700 and 800, control circuitry 304 may receive user selection of option 915 ("Next") to view storage usage statistics of the next time point (e.g., day after current selected time 905) or option 920 ("Back") to view storage usage statistics of a previous time point (e.g., day before current selected time 905). These options operate similarly to 714, 716 in interface 700 and 830, 835 in interface 800. Control circuitry 304 may receive user selection of option 910 ("View Graph") to view a graphic visualization of storage availability over time. In response to receiving user selection of option 910, control circuitry 304 may instruct display 312 to display an interface showing a graphic visualization of storage availability over time (e.g., illustrative visualizations 500, 600).

Figure 10:
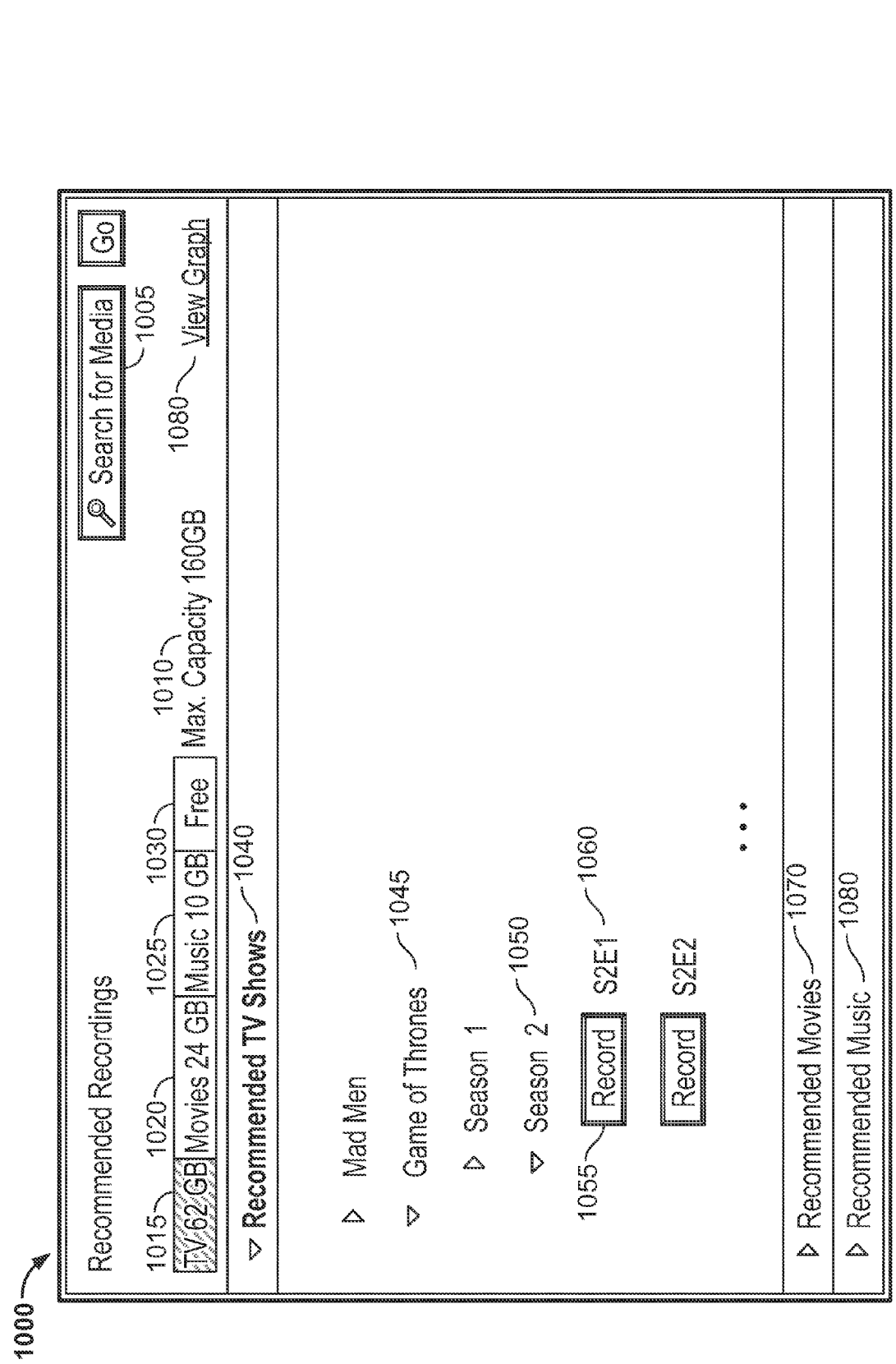
FIG. 10 is an illustrative interface providing recommended recordings to the user for a particular user-selected time in accordance with some embodiments of the disclosure.

FIG. 10 shows an illustrative interface 1000 providing recommended recordings to the user for a particular user-selected time in accordance with some embodiments of the disclosure. As in interface 700 and 800, control circuitry 304 may generate for display a storage usage breakdown visualization in interface 1000, as shown by components 1015 (storage usage by TV recordings), 1020 (storage usage by movie recordings), 1025 (storage usage by music recordings), 1030 (free storage space), and 1010 (maximum storage capacity). In some embodiments, control circuitry 304 may determine which media assets to recommend for recording based on previous storage usage activity, user preferences stored in storage 308 or retrieved from a remote server (e.g., residing at media guidance data source 418), user viewing history, and or any other history related to user consumption of media assets. In other embodiments, the determination of recommended recordings may be performed by a remote server (e.g., media guidance data source 418) and sent to recording device 300 upon request from control circuitry 304. These recommended media assets may be group together based on media category or any other commonly shared media characteristic, as discussed in relation to FIG. 7 and FIG. 8. As shown in FIG. 10, control circuitry 304 may instruct display 312 to display recommended TV assets in section 1040, recommended movie assets in section 1070, and recommended music assets in section 1080. Within each section, control circuitry 304 may further divide the recommended assets into categories of finer granularity to be displayed on display 312. For example, in section 1040 ("Recommended TV shows"), TV series are listed as the highest level of granularity, TV seasons are listed as the next level of granularity, and individual episodes within a season are listed as the finest level of category granularity. Control circuitry 304 may generate for display selectable option 1055 to record a recommended media asset 1060 on recording device 300. In response to receiving user selection of option 1055 ("record"), control circuitry 304 may provide a further option for the user to select a time at which to schedule the recording. Subsequent to the scheduling, control circuitry 304 may add the media asset to a list of scheduled recordings in storage 308. At the scheduled time, control circuitry 304 may retrieve the media asset from media guidance data source 418 and store it locally in storage 308. Additionally, control circuitry 304 may update the current storage usage value as stored in storage 308 and instruct display 312 to re-render the storage usage breakdown visualization to account for the additional space occupied by the new recording. The same or similar interaction flow applies to any recommended media assets display in interface 1000.

In situations where the user wishes to record media that are not listed in the sections of recommended media assets (e.g., 1040, 1070, 1080), a search option may be provided. Control circuitry 304 may generate for display search option 1005. In response to receiving user input of a search query (e.g., text naming or related to user's desire media asset) in text field 1005, control circuitry 304 may send a search request via communication path 302 over communications network 414 to media guidance data source 418 with the text input by the user. In response to receiving the search request, media guidance data source 418 may return, synchronously or asynchronously, results that match the search query. Control circuitry 304 may instruct display 312 to display these results in another interface (not shown).

As in FIG. 9, display 312 may also display an option 1040 for a user to view a graphic visualization of storage availability over time (as shown in interfaces 500 and 600). The operation of option 1040 is the same as option 910, as discussed in relation to FIG. 9.

Figure 11:
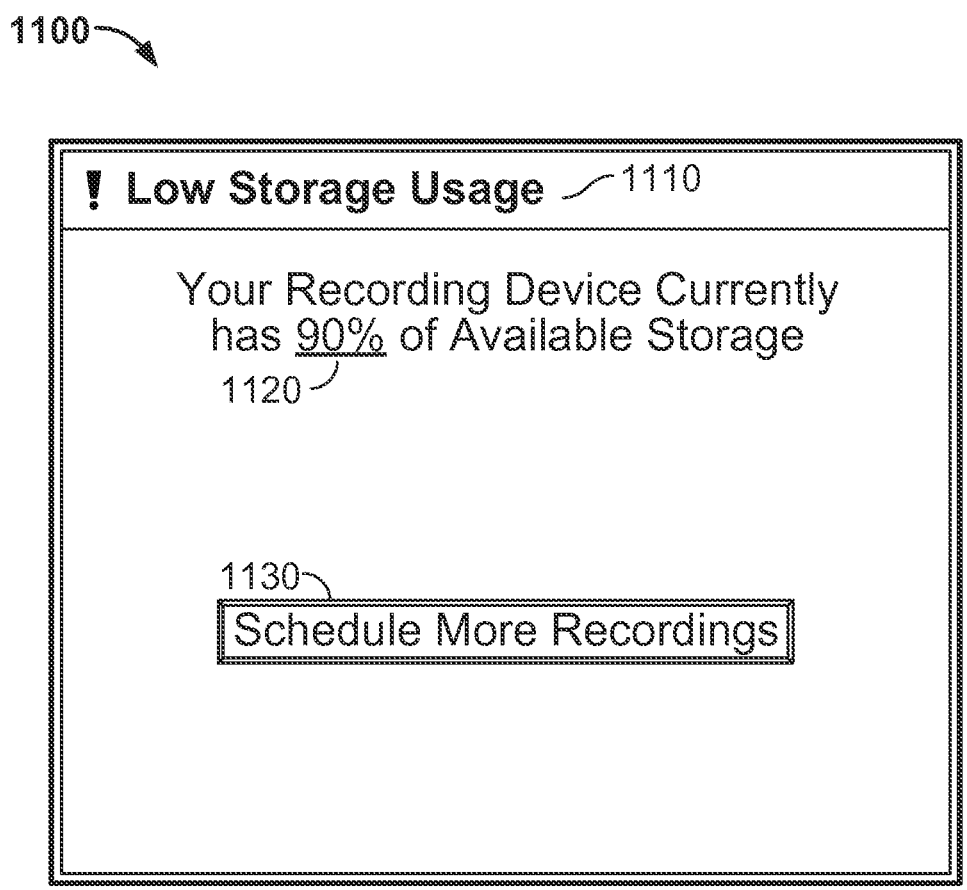
FIG. 11 is an illustrative notification of low storage usage in accordance with some embodiments of the disclosure.

FIG. 11 shows an illustrative notification 1100 of low storage usage in accordance with some embodiments of the disclosure. Control circuitry 304 may determine that storage 308 of recording device 300 has reached a critical state of low storage usage/high storage availability. This critical state may be marked by a threshold value 1120 (e.g., 90% of available storage), which may be measured as a percentage of total storage capacity used/available or a size of storage space (e.g., in KB, MB, GB) used/available. In response to determining that the critical state has been reached, control circuitry 304 may generate for display on display 312 a notification window or overlay informing the user that recording device 300 has low storage usage/high storage availability, as indicated in notification title 1110. Further details about how the notification is generated by control circuitry 304 are discussed in relation to FIG. 15. In some embodiments, control circuitry 304 may include in the notification an option 1130 to schedule more recordings. In response to receiving user selection of option 1130, control circuitry 304 may instruct display 312 to display an interface that allows the user to schedule more recordings. An illustrative interface 1000 has been discussed in relation to FIG. 10, where recommended recordings are automatically generated by control circuitry 304 or a remote server 418. Alternatively, instead of automatically generated recordings, control circuitry 304 may generate an interface allowing the user to search through all media assets available for recording (similar to the search feature 1005 as discussed in relation to FIG. 10).

Figure 12:
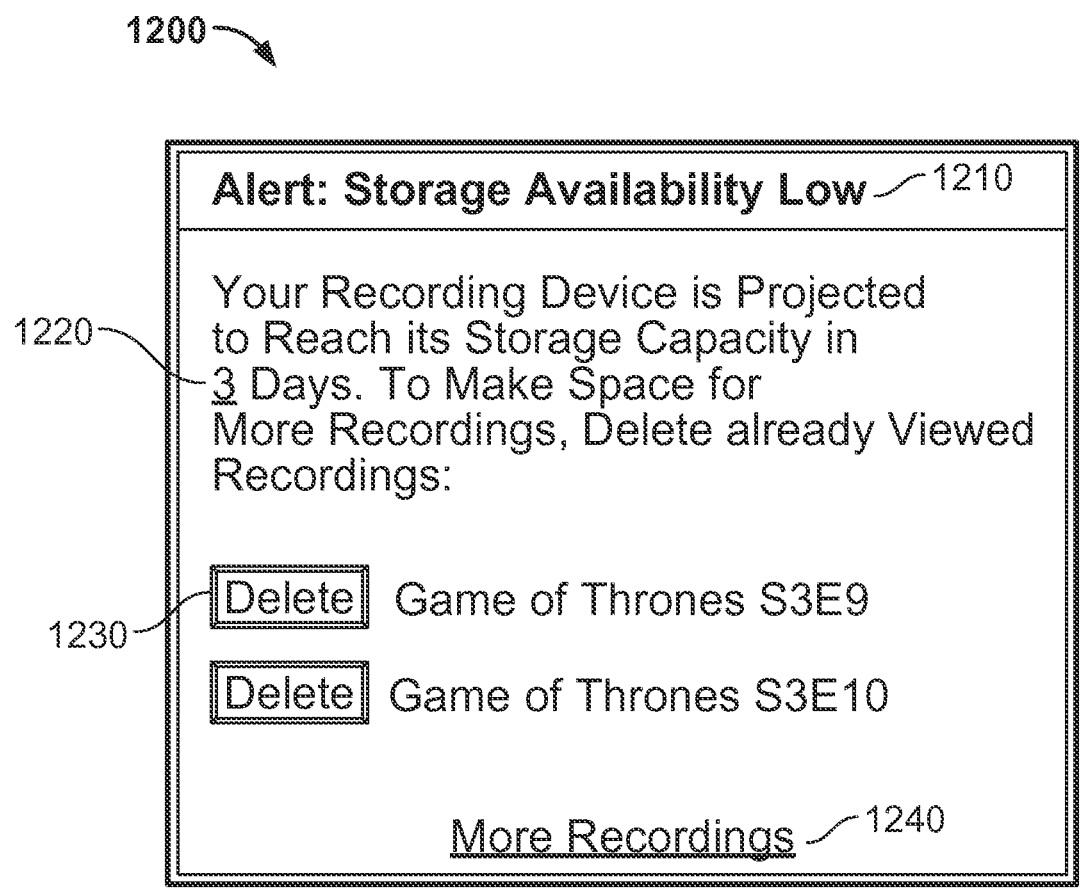
FIG. 12 is an illustrative notification of low storage availability in accordance with some embodiments of the disclosure.

FIG. 12 shows an illustrative notification 1200 of low storage availability in accordance with some embodiments of the disclosure. Notification 1200 is similar to notification 1100, except that it is generated by control circuitry 304 in response to determination of low storage availability (as opposed to low storage usage), as indicated in notification title 1210. Control circuitry 304 may determine that storage 308 of recording device has reached a critical state of high storage usage/low storage availability. This critical state may be marked by a threshold value associated with a high storage usage amount/low storage availability amount. Control circuitry 304 may instruct display 312 to display this threshold value (not shown). Control circuitry 304 may determine at how long it will take recording device 300 to reach its maximum storage capacity based on analysis of historical storage usage activity and instruct display 312 to display in notification 1200 this projected time 1220 (e.g., 3 days) for reaching maximum capacity. In response to determining that recording device 300 has reached a critical state of high storage usage/low storage availability, control circuitry 304 may generate a notification 1210 informing the user that the recording device 300 is projected to reach its maximum storage capacity in the near future. Further details about how this notification is generated by control circuitry 304 are discussed in relation to FIG. 15.

In some embodiments, control circuitry 304 may generate for display an option 1230 to delete a currently stored recording from recording device 300. Control circuitry 304 may generate for display more than one media asset to recommend for deletion. Control circuitry 304 may select a recording for recommended deletion in response to determining that the recording has already been viewed by the user. Control circuitry 304 may additionally generate for display an option 1240 allowing the user to view more stored recordings to delete. In response to receiving user selection of option 1240 ("more recordings"), control circuitry 304 may instruct display 312 to display another interface (e.g., illustrative interface 700) which presents currently stored recordings to the user for deletion.

Control circuitry 304 may determine that storage 308 of recording device 300 has reached a critical state of low storage usage/high storage availability. This critical state may be marked by a threshold value 1120 (e.g., 90% of available storage), which may be measured as a percentage of total storage capacity used/available or a size of storage space (e.g., in KB, MB, GB) used/available. In response to determining that the critical state has been reached, control circuitry 304 may generate for display on display 312 a notification window or overlay informing the user that recording device 300 has high storage availability. Further details about how the notification is generated by control circuitry 304 are discussed in relation to FIG. 15. In some embodiments, control circuitry 304 may include in the notification an option 1130 to schedule more recordings. In response to receiving user selection of option 1130, control circuitry 304 may instruct display 312 to display an interface that allows the user to schedule more recordings. An illustrative interface 1000 has been discussed in relation to FIG. 10, where recommended recordings are automatically generated by control circuitry 304 or a remote server 418. Alternatively, instead of automatically generated recordings, control circuitry 304 may generate an interface allowing the user to search through all media assets available for recording (similar to the search feature 1005 as discussed in relation to FIG. 10).

Figure 13:
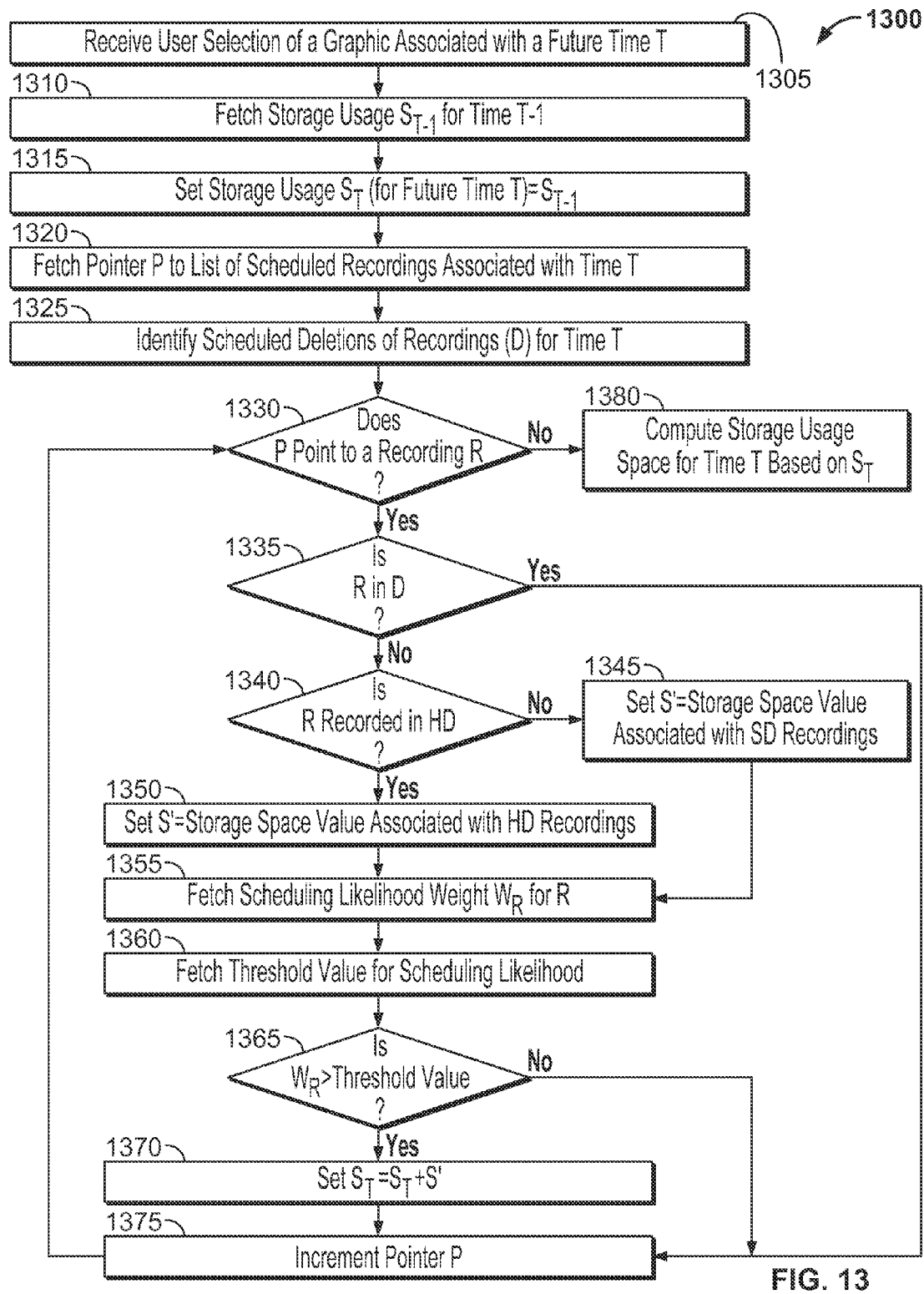
FIG. 13 is a flow-chart of the illustrative steps involved in computing projected storage usage at a particular future time in accordance with some embodiments of the disclosure.

FIG. 13 shows a flow-chart 1300 of the illustrative steps involved in computing projected storage usage at a particular future time T in accordance with some embodiments of the disclosure. At step 1305, control circuitry 304 may receive user selection of graphic visualization (e.g., illustrative examples 500 and 600) corresponding to a future time T. Control circuitry 304 may then fetch storage usage $S_{T-1}$ for time T-1 from storage 308. This storage usage value may have been computed by processing circuitry 306 and stored in storage 308. For example, control circuitry 304 may receive user selection of point 585 in illustrative graphic visualization 500 corresponding to a future day June 16, 2013 at step 1305. At step 1310, control circuitry 304 may fetch the storage usage value for the previous day June 15, 2013 from storage 308. Control circuitry 304 may initialize a temporary storage usage variable $S_T$ representing the amount of projected storage usage for future time T. At step 1315, control circuitry 304 may set the temporary storage usage variable $S_T$ as the value retrieved for storage usage computed for time T-1 (e.g., previous day) $S_{T-1}$. Control circuitry 304 may fetch a pointer P from storage 308 to a list of scheduled recordings associated with future time T at step 1320. These scheduled recordings may include recordings that were actually scheduled by a user, recordings that were projected to be scheduled (e.g., projected recordings presented in interface 800) based on predictive analysis of storage usage activity by control circuitry 304 or a remote server (e.g., media guidance data source 418), recordings that were scheduled to be deleted, and/or recordings that were projected to be scheduled for deletion. At step 1325, control circuitry 304 may identify those recordings D that were actually scheduled for deletion and/or projected to be scheduled for deletion. These recordings D may be stored in temporary storage in storage 308, to be accessed by control circuitry 304 at a later step. Control circuitry 304 determines whether pointer P points to a recording R at step 1330. If not, control circuitry 304 determines that no media assets are actually scheduled for recording or projected to be scheduled for recording at future time T. In response to this determination, control circuitry 304 may advance to step 1380 and set the storage usage space for future time T to be the same as that of the previous day (e.g., $S_T=S_{T-1}$). If, however, control circuitry 304 determines at step 1330 that pointer P does point to a recording, then there exists at least one recording R that is scheduled or projected to be scheduled at future time T. In response to determining that P does point to a recording R, control circuitry 304 advances to step 1335 and determines whether recording R exists in recordings D that were identified to be scheduled for deletion. For example, if a media asset were scheduled to be recorded at the beginning of day T but then subsequently scheduled for deletion by the user at a later time in day T, the media asset may on both the list of scheduled recordings for time T and the list of scheduled deletions for time T. In response to determining that recording R is in recordings D, control circuitry 304 may not compute the storage space occupied by recording R and instead increment pointer P at step 1375 to point to the next recording in the scheduled recordings so that the next recording R may be evaluated at step 1330. If, however, control circuitry 304 determines at step 133 that recording R does not exist in recordings D, control circuitry 304 may proceed to compute the projected storage space occupied by recording R by first determining the recording quality of recording R in step 1340. In response to determining that recording R is scheduled to be recorded in High Definition (HD), control circuitry 304 may set a temporary storage value S' for recording R as the storage space value associated with HD recordings (e.g., 8 GB). On the other hand, in response to determining that recording R is not scheduled to be recorded in HD (e.g., but rather in Standard Definition (SD)), control circuitry 304 may set storage value S' for recording as the storage space value associated with SD recordings (e.g., 1 GB) at step 1345.

Once the value of S' has been set, control circuitry 304 may advance to step 1355 and fetch a scheduling likelihood weight $W_R$ for recording R. $W_R$ refers to a likelihood that a given recording R will be recorded. $W_R$ may be measured as a probability (e.g., in percentage or a value between 0 and 1, inclusive) or another confidence value associated with the estimation that R would be scheduled for recording. For recordings which are actually scheduled by the user, the scheduling likelihood is assigned a maximum value (e.g., probability of 100% or 1). For recordings which were not scheduled by the user but rather automatically projected to be recorded by control circuitry 304 or remote server (e.g., media guidance data source 418), the scheduling likelihood is smaller (e.g., probability of less than 100% or less than 1). At step 1360, control circuitry 304 additionally fetches a threshold value for scheduling likelihood from storage 308. For example, the threshold value may be a cut-off probability of scheduling likelihood (e.g., 50% or 0.5). In response to determining that $W_R$ exceeds the threshold value at step 1365, control circuitry 304 may determine that recording R is likely to be recorded and increment the storage usage value $S_T$ for the selected future time T by S' as calculated in step 1345 or 1350. Control circuitry 304 may then advance to step 1375. If, however, control circuitry 304 determines that $W_R$ is lower than the threshold value in step 1365, control circuitry 304 may determine that recording R is not likely to be recorded and advance to step 1375, as it may not be useful to include the storage space value S' associated with recording R in the computation of storage usage for time T. Once pointer P is incremented at step 1375, control circuitry 304 returns to step 1330 to check whether there are other recordings R left to be examined from the list of scheduled recordings. When control circuitry 304 has examined all the recordings in the list of scheduled recordings for time T, control circuitry 304 will advance to the final step 1380, where control circuitry 304 will compute the storage usage space of recording device 300 based on the final value stored for $S_T$. Depending on which scheduled recordings $S_T$ was calculated for (e.g., only TV recordings, only movie recordings, recordings of all types of media assets, etc.), control circuitry 304 may or may not need to perform the process shown in flow-chart 1300 for another group of scheduled recordings. For example, if pointer P fetched at step 1320 pointed to all types of recordings scheduled or projected to be scheduled for time T, control circuitry may set the storage usage space for time T as $S_T$. However, if pointer P only pointed to TV recordings, then control circuitry 304 would have to perform the same computation of storage usage space for other types of media recordings to compute the total storage space used on recording device 300. The process illustrated by flow-chart 1300 may be used to determine the storage usage statistics shown in the statistics interface 900. The process may also be used to generate the different points/bars of storage availability in the graphic visualizations 500 and 600.

Figure 14:
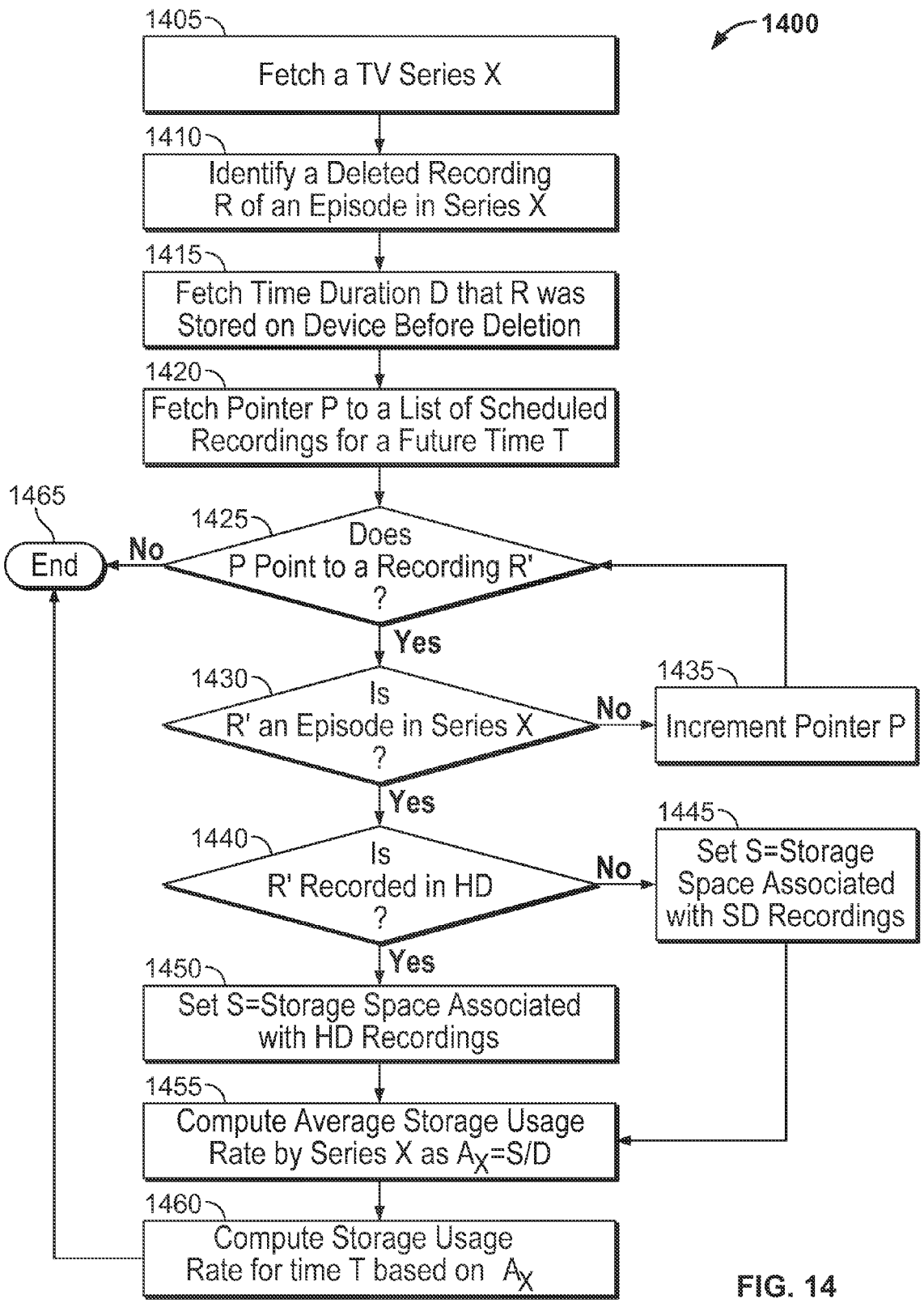
FIG. 14 is a flow-chart of the illustrative steps involved in computing storage usage rate in accordance with some embodiments of the disclosure.

FIG. 14 shows a flow-chart 1400 of the illustrative steps involved in computing storage usage rate of a TV series in accordance with some embodiments of the disclosure.

Control circuitry 304 may fetch a TV series X from storage 308 at step 1405. X may be fetched from a plurality of TV series stored together in storage 308. At step 1410, control circuitry 304 may identify a deleted recording R of an episode in series X. Control circuitry 304 may perform this identification fetching a list of recently deleted recordings from storage 308. The recording that is listed may also include additional metadata, such as but not limited to categorical characteristics (e.g., TV series, season number, episode number, time at which the recording was deleted, time at which it was recorded, etc.). Control circuitry 304 may iterate through all recordings in the list and their associated metadata to determine whether any of them was a TV episode in TV series X. At step 1415, control circuitry 304 may determine a time duration D for which R was stored on recording device 300 before deletion. Control circuitry 304 may determine time duration D for deleted recording R by identifying in the associated metadata: 1) the time at which R was recorded, and 2) the time at which R was deleted. Upon identification of these two points in time, control circuitry 304 may instruct processing circuitry 306 to compute the time difference between the two points in time to determine how long recording R was stored on recording device 300 before deletion (time duration D). At step 1420, control circuitry 304 may fetch pointer P which points to a list of scheduled recordings for a future time T. These scheduled recordings may be recordings actually scheduled by the user through user input interface 310 or projected scheduled recordings as determined based on predictive analysis of storage usage activity performed by control circuitry 304 of recording device 300 and/or remote server 418. Similar to step 1330 in flow-chart 1300, control circuitry 304 determines whether pointer P points to a recording R' at step 1425. In response to determining that pointer P does not point to a recording, the computation process of flow-chart 1400 is halted and control circuitry 304 advances to the end 1465, as there exist no scheduled recordings at future time T for which to compute a rate of storage usage at time T. If, however, control circuitry 304 determines that pointer P does point to a recording R' at step 1425, control circuitry 304 may proceed to examine the metadata associated with recording R'. At step 1430, control circuitry 304 reads to the metadata to determine whether recording R' is an episode in series X. In response to determining that recording R' is not an episode in series X, control circuitry 304 may increment pointer P to point to the next recording R' in the scheduled recordings list from step 4120. If, however, control circuitry 304 determines that R' is an episode of series X at step 1430, control circuitry 304 may advance to step 1440, where control circuitry 304 further inspects the metadata associated with R' to determine whether R' is scheduled to be recorded in HD. Steps 1440, 1445, and 1450 (storage space S used by recording R' is calculated) proceed similarly to steps 1340, 1345, and 1350, respectively, so their descriptions are not provided. From step 1350, control circuitry 304 computes an average storage usage rate $A_X$ for series X by dividing storage space used by recording R' by time duration D determined for recording R at step 1415. At step 1460, control circuitry 304 computes a storage usage rate for future time T based on $A_x$ computed at step 1455.

A similar process as shown in flow-chart 1400 may be used to compute a storage usage rate for other types of recordings (e.g., TV miniseries installments, music album tracks, tracks from the same song artist or band, movies within a same genre, etc.). For example, instead of fetching a TV series X at step 1405, control circuitry 304 may fetch a song artist X, and instead of identifying a deleted recording R of an episode in series X at step 1410, control circuitry 304 may identify a deleted recording R of a song track created by song artist X.

The storage usage rate computed at step 1460 may be used to compute the storage usage rates listed in statistics interface 900 (e.g. 940, 945, 950 shown in FIG. 9) or any type of storage usage rate not shown in FIG. 9. To compute an aggregate storage usage rate for all types of media (not just a TV series as illustrated in flow-chart 1400), control circuitry 304 may perform a similar process for computing storage usage rate for other types of media and average all of them to compute an overall storage usage rate of recording device 300. Control circuitry 304 may additionally or alternatively use the compute storage usage rate from step 1460 to generate the graphic visualization (e.g., 500, 600) of storage availability over time. For example, control circuitry 304 may use the computed storage usage rate to determine the slope of the lines drawn in graphic visualization 500 connecting different points of storage availability over time.

Figure 15:
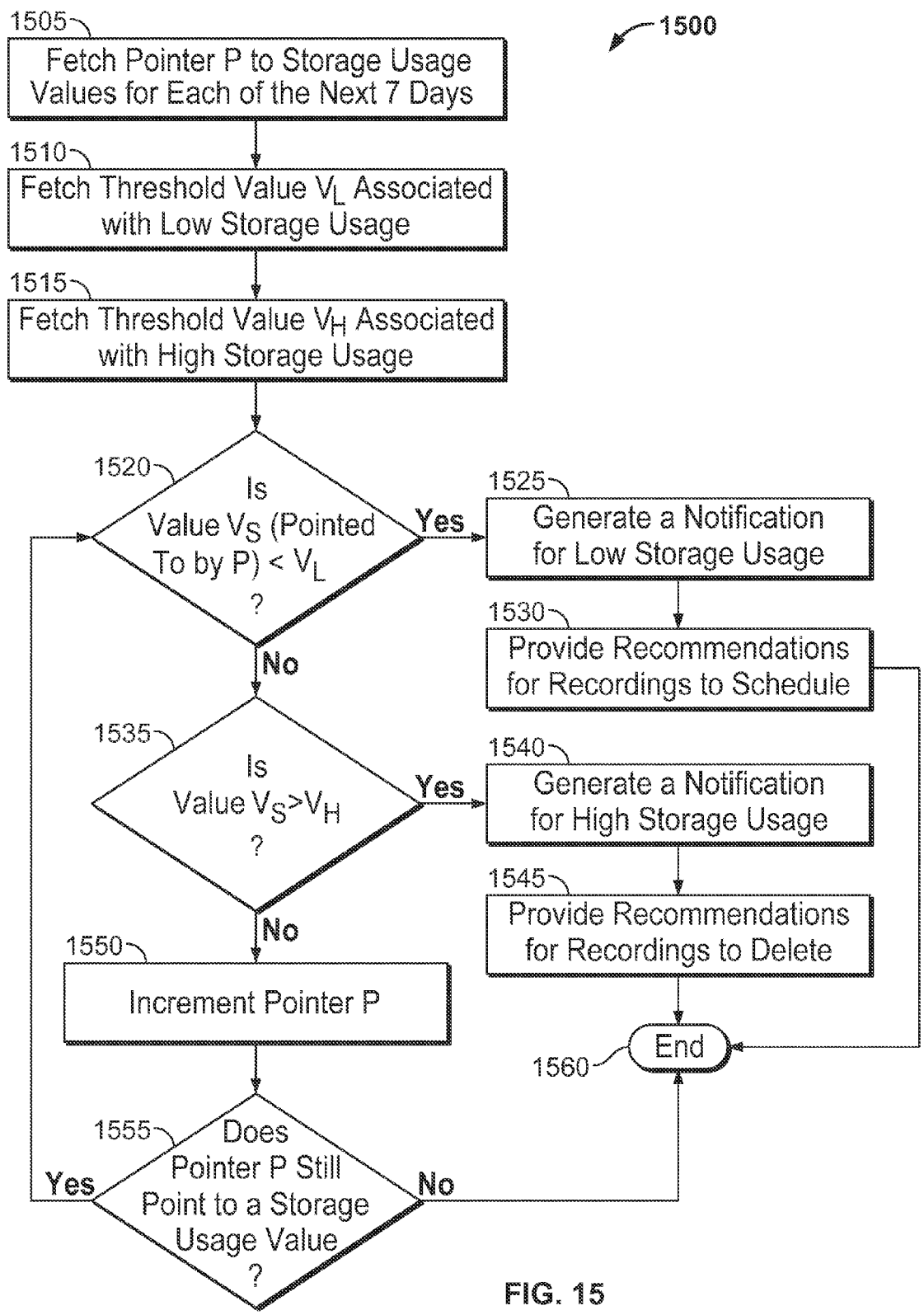
FIG. 15 is a flow-chart of the illustrative steps involved in generating notifications in accordance with some embodiments of the disclosure.

FIG. 15 shows a flow-chart 1500 of the illustrative steps involved in generating notifications in accordance with some embodiments of the disclosure. The process illustrated in flow-chart 1500 may be used to generate illustrative notifications 1100 and 1200 in FIG. 11 and FIG. 12, respectively.

At step 1505, control circuitry 304 may fetch pointer P to storage usage values for a given time frame (e.g., next 7 days). These storage usage values may be stored in storage 308 and previously computed by control circuitry 304 using the process or one similar to the process illustrated in FIG. 13. At step 1510, control circuitry 304 may fetch a threshold value $V_L$ associated with a critical state of low storage usage. As discussed in relation to FIG. 11, $V_L$ may be a percentage of total storage capacity used/available on recording device 300 (e.g., 10% used or 90% available) or a size of storage space used/available (e.g., 10 GB used or 150 GB available). Control circuitry 304 may also fetch a threshold value $V_H$ associated with a critical state of high storage usage at step 1515. As discussed in relation to FIG. 12, $V_H$ may be a percentage of total storage capacity used/available on recording device 300 (e.g., 90% used or 10% available) or a size of storage space used/available (e.g., 150 GB or 10 GB available). At step 1520, control circuitry 304 determines whether the value $V_S$ pointed to by pointer P is less than the low storage usage threshold $V_L$. In response to determining that $V_S$ is lower than $V_L$, control circuitry 304 generates for display a notification for low storage usage at step 1525. An illustrative notification is shown and discussed in FIG. 11. In some embodiments, control circuitry 304 may immediately instruct display 312 to display the notification. In other embodiments, control circuitry 304 may store the notification in storage 308 and instruct the notification to be displayed at a next time the user tries to record additional media assets on recording device 300.

In response to determining that $V_S$ is not lower than threshold value $V_L$, control circuitry 304 may additionally determine at step 1535 whether $V_S$ exceeds the high storage usage threshold value $V_H$. In response to determining that $V_S$ exceeds $V_H$, control circuitry 304 may generate for display a notification for high storage usage. An illustrative notification is shown in FIG. 12. As shown and discussed in FIG. 12, control circuitry 304 may, at step 1545, additionally provide recommendations to the user for which recordings to delete from recording device 300. Control circuitry 304 may then advance to the end 1560.

In response to determining that $V_S$ does not exceed the high storage usage threshold value $V_H$ at step 1535 and that $V_S$ is not lower than the low storage usage threshold value $V_L$ at step 1520, control circuitry 304 may proceed to examine the storage usage value computed for the next day listed within the given time frame (e.g., next 7 days), as indicated in step 1505. In order to inspect the next storage usage value, control circuitry 304 may increments pointer P at step 1550 to point to the next storage value and checks at step 1555 whether pointer P still points to a storage usage value. If so, control circuitry 304 returns to step 1520 and proceeds accordingly as before. In response to determining that pointer P no longer points to a storage usage value, control circuitry 304 determines that pointer P has reached the end of the list of storage usage values computed for the times within the given time frame (e.g., next 7 days) and advances to completion 1560.

The above-described embodiments of the present disclosure are presented for purposes of illustration and not of limitation, and the present disclosure is limited only by the claims which follow.

What is claimed is:

1. A method for visualizing storage availability of a recording device, the method comprising:
analyzing storage usage activity on the recording device;
determining, based on the analyzed storage usage activity, storage availability of the recording device over time;
visualizing, using a graphic, change in the storage availability over time, wherein the graphic simultaneously displays a plurality of time points;
receiving user input that navigates to one of the plurality of time points in the graphic, wherein the one of the plurality of time points to which the user input navigates corresponds to a storage availability of the recording device at a particular future time; and responsive to receiving the user input, presenting to the user at least one media asset associated with the storage availability at the particular future time.

2. The method of claim 1, wherein the storage usage activity comprises at least one of:
  past recordings of media assets,
  scheduled recordings of media assets,
  past deletions of recorded media assets,
  scheduled deletions of recorded media assets, and
  past cancelations of scheduled recordings of media assets.

3. The method of claim 1, further comprising determining that a media asset will likely be recorded based on at least one of:
  viewing history of at least one related media asset;
  recording history of at least one related media asset;
  deletion history of at least one related media asset;
  cancelation history of at least one related media asset;
  user preference of at least one related media asset;
  the media asset type; and
  pattern of recording media assets.

4. The method of claim 1, wherein the determining of storage availability over time comprises:
  identifying a time duration for which an episode of a series is stored on the recording device before being deleted from the recording device;
  determining whether another episode of the series is scheduled for recording at the particular future time; and
  computing a rate of storage usage of the recording device based on the identified time duration and the determination of whether the another episode is scheduled for recording at the particular future time.

5. The method of claim 4, further comprising:
  responsive to determining that the another episode of the series is scheduled for recording at the particular future time, computing an amount of storage that will be occupied by the recording of the another episode;
  calculating an average rate of storage usage by the series based on the amount of storage that will be occupied and the identified time duration, wherein the rate of storage usage of the recording device is computed based at least in part on the calculated average rate of storage usage by the series.

6. The method of claim 1, wherein the graphic shows the change in storage availability over time by simultaneously displaying storage availability of the recording device at different times in the past, present, and future.

7. The method of claim 1, further comprising:
  determining that storage availability of the recording device will be high; and
  responsive to determining that the storage availability will be high, generating a recommendation to record at least one media asset based on the analyzed storage usage activity.

8. The method of claim 1, further comprising:
  determining that the recording device will reach a full storage capacity; and
  responsive to determining that the recording device will reach a full storage capacity, generating a recommendation to delete at least one media asset based on the analyzed storage usage activity.

9. The method of claim 1, wherein the user input visually distinguishes a portion of the graphic that corresponds to the one of the time points, wherein the at least one media asset presented to the user is scheduled for recording at the particular future time corresponding to the one of the time points.

10. The method of claim 1, further comprising:
  identifying all recordings scheduled to be deleted from the recording device at the particular future time; and
  identifying all recordings scheduled to be recorded on the recording device at the particular future time, wherein the at least one media asset presented to the user at the particular future time comprises a first indication of the identified all recordings scheduled to be deleted and a second indication of the identified all recordings scheduled to be recorded.

11. A system for visualizing storage availability of a recording device, the system comprising control circuitry configured to:
  analyze storage usage activity on the recording device;
  determine, based on the analyzed storage usage activity, storage availability of the recording device over time;
  visualize, using a graphic, change in the storage availability over time, wherein the graphic simultaneously displays a plurality of time points;
  receive user input that navigates to one of the plurality of time points in the graphic, wherein the one of the plurality of time points to which the user input navigates corresponds to a storage availability of the recording device at a particular future time; and
  responsive to receiving the user input, present to the user at least one media asset associated with the storage availability at the particular future time.

12. The system of claim 11, wherein the storage usage activity comprises at least one of:
  past recordings of media assets,
  scheduled recordings of media assets,
  past deletions of recorded media assets,
  scheduled deletions of recorded media assets, and
  past cancelations of scheduled recordings of media assets.

13. The system of claim 11, wherein the control is circuitry further configured to determine that a media asset will likely be recorded based on at least one of:
  viewing history of at least one related media asset;
  recording history of at least one related media asset;
  deletion history of at least one related media asset;
  cancelation history of at least one related media asset;
  user preference of at least one related media asset;
  the media asset type; and
  pattern of recording media assets.

14. The system of claim 11, wherein the storage availability over time is determined by control circuitry configured to:
  identify a time duration for which an episode of a series is stored on the recording device before being deleted from the recording device;
  determine whether another episode of the series is scheduled for recording at the particular future time; and
  compute a rate of storage usage of the recording device based on the identified time duration and the determination of whether the another episode is scheduled for recording at the particular future time.

15. The system of claim 14, wherein the control circuitry is further configured to:
  responsive to determining that the another episode of the series is scheduled for recording at the particular future time, compute an amount of storage that will be occupied by the recording of the another episode;
  calculate an average rate of storage usage by the series based on the amount of storage that will be occupied and the identified time duration, wherein the rate of storage usage of the recording device is computed based at least in part on the calculated average rate of storage usage by the series.

16. The system of claim 11, wherein the graphic shows the change in storage availability over time by simultaneously displaying storage availability of the recording device at different times in the past, present, and future.

17. The system of claim 11, wherein the control circuitry is further configured to:
   determine that storage availability of the recording device will be high; and
   responsive to determining that the storage availability will be high, generate a recommendation to record at least one media asset based on the analyzed storage usage activity.

18. The system of claim 11, wherein the control circuitry is further configured to:
   determine that the recording device will reach a full storage capacity; and
   responsive to determining that the recording device will reach a full storage capacity, generate a recommendation to delete at least one media asset based on the analyzed storage usage activity.

19. The system of claim 11, wherein the user input visually distinguishes a portion of the graphic that corresponds to the one of the time points time, wherein the at least one media asset presented to the user is scheduled for recording at the particular future time corresponding to the one of the time points.

20. The system of claim 11, wherein the control circuitry is further configured to:
   identify all recordings scheduled to be deleted from the recording device at the particular future time; and
   identify all recordings scheduled to be recorded on the recording device at the particular future time, wherein the at least one media asset presented to the user at the particular future time comprises a first indication of the identified all recordings scheduled to be deleted and a second indication of the identified all recordings scheduled to be recorded.

* * * * *